United States Patent
Vija et al.

(10) Patent No.: US 8,184,876 B2
(45) Date of Patent: May 22, 2012

(54) NNLS IMAGE RECONSTRUCTION

(75) Inventors: A. Hans Vija, Evanston, IL (US); Amos Yahil, Stony Brook, NY (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 1138 days.

(21) Appl. No.: 11/931,294

(22) Filed: Oct. 31, 2007

(65) Prior Publication Data

US 2008/0270465 A1    Oct. 30, 2008

Related U.S. Application Data

(60) Provisional application No. 60/913,935, filed on Apr. 25, 2007.

(51) Int. Cl.
*G06K 9/00* (2006.01)
(52) U.S. Cl. .................. 382/128; 382/131; 382/154
(58) Field of Classification Search .................. 382/128
See application file for complete search history.

(56) References Cited

U.S. PATENT DOCUMENTS

| | | | |
|---|---|---|---|
| 5,912,993 A * | 6/1999 | Puetter et al. ............... 382/275 |
| 6,208,138 B1 * | 3/2001 | Lai et al. ..................... 324/307 |
| 7,342,397 B2 * | 3/2008 | Pruessmann et al. ......... 324/307 |
| 7,348,776 B1 * | 3/2008 | Aksoy et al. ................. 324/307 |
| 7,864,999 B2 * | 1/2011 | Chang et al. ................. 382/128 |
| 2003/0048937 A1 * | 3/2003 | Gullberg et al. ............. 382/131 |
| 2007/0297656 A1 * | 12/2007 | DeMan et al. ............... 382/128 |

* cited by examiner

*Primary Examiner* — Phillip A Johnston
(74) *Attorney, Agent, or Firm* — Peter Kendall

(57) ABSTRACT

In an aspect, reconstructing an image object associated with an input data set, includes for each step, in a series of iteration steps, determining an updated object from an input object based on a data model of the input object, a weighting-factor data set, and a gradient object, wherein the weighting-factor data set includes modified entries of the input data set. Reconstructing the image object further includes following a last iteration, outputting one of the updated objects as the image object.

25 Claims, 22 Drawing Sheets

NNLS IMAGE RECONSTRUCTION

CROSS-REFERENCE TO RELATED APPLICATION(S)

This application claims the benefit of priority under 35 U.S.C. §119(e) from U.S. Provisional Patent Application Ser. No. 60/913,935, filed Apr. 25, 2007 and entitled "Use of Modified Cumulative Distribution Function CDF for Visual Inspection and Quantitative Determination of Image Quality in Clinical Workflows of Poisson-Distributed Counts."

TECHNICAL FIELD

An embodiment of the invention relates to image reconstruction, and in particular, to image reconstruction in medical imaging.

BACKGROUND

An overview of different reconstruction methods including a pixon method is given in R. C. Puetter et al., "Digital Image Reconstruction: Debluring and Denoising," Annu. Rev. Astro. Astrophys., 2005, 43: 139-194; the pixon method is described in R. C. Puetter et al., "The pixon method of image reconstruction," Astronomical Data Analysis Software and Systems VIII., edited by D. M. Mehringer, R. L. Plante D. A. Roberts, Astronomical Society of the Pacific, San Francisco, ASP Conference Series 1999, 172, 307-316, the contents of which are herein incorporated by reference. An application of the pixon method to medical planar imaging is discussed in C. A. Wesolowski et al., "Improved lesion detection from spatially adaptive, minimally complex, Pixon® reconstruction of planar scintigraphic images", Comput. Med. Imaging Graph., 2005, 29, 65-81, the contents of which are herein incorporated by reference.

SUMMARY

An embodiment of the invention is based in part on the recognition that one can base a non-negative least-square fit on a statistic that is adapted to data following a Poisson statistics.

In an aspect, reconstructing an image object associated with an input data set, includes for each step, in a series of iteration steps, determining an updated object from an input object based on a data model of the input object, a weighting-factor data set, and a gradient object, wherein the weighting-factor data set includes modified entries of the input data set. Reconstructing the image object further includes following a last iteration, outputting one of the updated objects as the image object.

In another aspect, a nuclear imaging device for providing a 3D image object includes a detector unit for detecting radiation emitted from within a detecting area and providing an input data set indicative of the detected radiation, an iterative reconstruction unit configured to for each step, in a series of iteration steps, determining an updated object from an input object based on a data model of the input object, a weighting-factor data set, and a gradient object, wherein the weighting-factor data set includes modified entries of the input data set, and an output port for providing one of the updated objects as the 3D image object.

Implementations may include one or more of the following features. Determining an updated object may include determining the data model of the input object, determining a residual data set from the data model and the input data set, determining the weighting-factor data set by modifying the entries of the input data set, determining the gradient object based on the residual data set and the weighting-factor data set, and performing an update operation for updating the input object based on the gradient object, thereby creating the updated object.

Determining the weighting-factor data set may include determining the sum of the value of the input data set at a data point and a statistical-data-offset number.

Determining the gradient object may include for each data point, dividing the value of the residual data set by the corresponding value of the weighting-factor data set, thereby creating a weighted-residual data set, projecting the weighted-residual data set into object space, thereby creating a preliminary-gradient object, and constraining the preliminary-gradient object to yield the gradient object.

Constraining the preliminary-gradient object may include generating a temporary object by inverting a preconditioner object, setting a value of the temporary object to zero for an object point having a negative value of the input object, and multiplying the values of the preliminary-gradient object with the associated adjusted temporary object to yield the gradient object.

Reconstructing an image object may further include calculating the preconditioner object based on a result of inverting the weighting-factor data set.

Calculating the preconditioner object may include projecting the inverted values of the weighting-factor data set into object space.

Determining the update object may further include determining a scalar factor based on the gradient object, the residual data set, and the weighing-factor data set. Determining the scalar factor may include projecting the gradient object into data space, thereby creating a gradient data set, for each data point, dividing the product of the entries of the gradient data set and the residual data set, by the corresponding entry of the weighting-factor data set, thereby creating a numerator data set, for each data point, dividing the square of the data gradient by the weighting factor, thereby creating a denominator data set, and determining the ratio of the sum over the entries of the numerator data set and the sum over the entries of the denominator data set, thereby creating the scalar factor.

Performing the update operation may include adding, to a value of the input object, the product of the corresponding value of the gradient object and the scalar factor.

Determining the updated object may further include a smoothing operation selected from the group consisting of smoothing operations based on pixon smoothing, smoothing operations based on Fourier filtering, smoothing operations based on wavelet filtering, smoothing operations based on filtering with a Wiener filter, and smoothing operations based on filtering with a fixed filter.

The smoothing operation may be performed in series with the update operation. For example, the smoothing operation on the input object may be performed before performing the update operation. Alternatively, or in addition the smoothing operation may be performed following performing the update operation and then create the updated object. When using multiple smoothing operations, one may use a smoothing operation and its transpose operation.

Reconstructing an image object may further include performing the smoothing operation, thereby creating a smoothed object and performing a forward projection operation of the smoothed object from an object space into a data space.

Determining the scalar factor may include performing the smoothing operation on the gradient object before projecting the gradient object into data space.

Reconstructing an image object may further include performing a backward projection operation, thereby creating a back-projected object and performing the pixon smoothing operation on the back-projected object.

Determining the updated object may further include projecting the weighted-residual data set into object space, thereby creating a weighted-residual object; and performing the smoothing operation on the weighted-residual object, thereby creating the preliminary-gradient object.

Calculating the preconditioner object may include following projecting the inverted values of the weighting-factor data set into object space, performing the smoothing operation, thereby creating the preconditioner object.

Determining the updated object may further include updating a constraining map of the smoothing operation based on the input data set and the updated object of the preceding iteration step. One may further determine whether the constraining map update is necessary and update the constraining map based on the result of the evaluation, the input data set, and an updated object of the image object.

Determining the updated object may further include determining that a convergence-criterion of the data model has transitioned from being outside the limitation of a preset threshold value to being inside the limitation. Determining the convergence-criterion includes setting the convergence-criterion to be the difference between the values of a chi-square-gamma statistic derived from two succeeding updated objects.

Determining an updated object may further include performing a loop over subsets of the data set and performing the update operation within the loop.

The detector unit of the nuclear imaging device may comprise a detector system selected from the group consisting of a positron emission tomography detector system and a single photon computed tomography detector system.

That last updated object may be outputted as the image object.

These general and specific aspects may be implemented using a system, a method, a computer readable medium, or a computer program, or any combination of systems, methods, a computer readable medium, or a computer programs.

Certain implementations may have one or more of the following advantages. Non-negative least square fits in image reconstruction have the advantage that they are quadratic in the image model. Their gradients are therefore quadratic in the image model and setting them to zero results in a linear set of equations for the image model, which can be solved iteratively, for example, by a conjugate gradient method.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
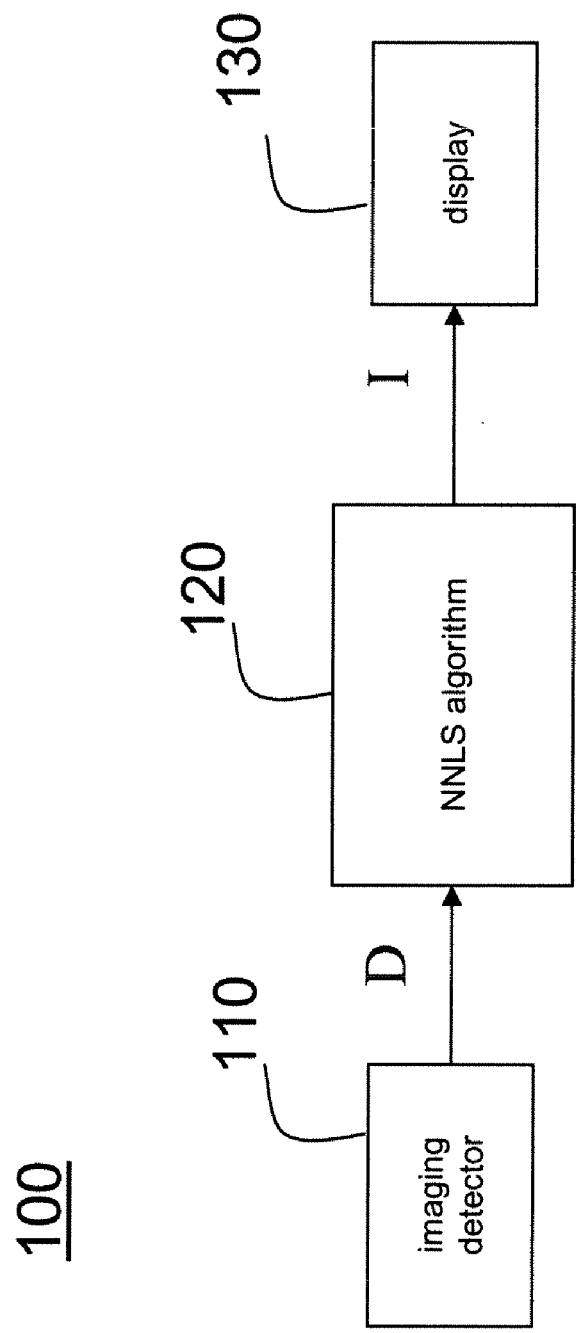
FIG. 1 is an overview of a nuclear imaging system.

FIG. 1 shows a nuclear imaging system 100 with an imaging detector 110, and an image reconstruction unit 120 using a non-negative least squares (NNLS) algorithm. The NNLS algorithm provides a reconstructed image object I. The image object I, which is defined in an object space, is a reconstruction of a data set D measured in a data space. The object space is the space in which the result of the image reconstruction is defined and which corresponds to the 3D volume that was imaged using the nuclear imaging system 100.

The NNLS algorithm is especially suited for reconstructing an object from a measured data set with a low number of counts and an unavoidable noise contribution. Such data sets are produced, for example, with medical imaging techniques in nuclear medicine, which produce 3D images of, for example, a functional process in a patient's body by using nuclear properties of matter. Examples of such imaging techniques are Positron Emission Tomography (PET) and Single Photon Computed Tomography (SPECT). For these types of nuclear imaging, one administers a radioactive substance to the patient and detects emitted radiation with a detector system, e.g., with a ring detector for PET or with one or several gamma cameras for SPECT.

The imaging detector 110 of the nuclear imaging system 100 detects the γ-radiation emitted from the patient. Therefore, it is positioned around or partly around the patient and could be a conventional SPECT or PET detector system. The imaging detector 110 provides the data set D to the image reconstruction unit 120, which uses a system matrix H to describe the properties of the nuclear imaging system 100, and an iteratively improved data model to calculate the image object I on the basis of the data set D. A 3D image object I is then displayed on a display 130 using well-known volume rendering techniques.

NNLS Algorithm

Figure 2:
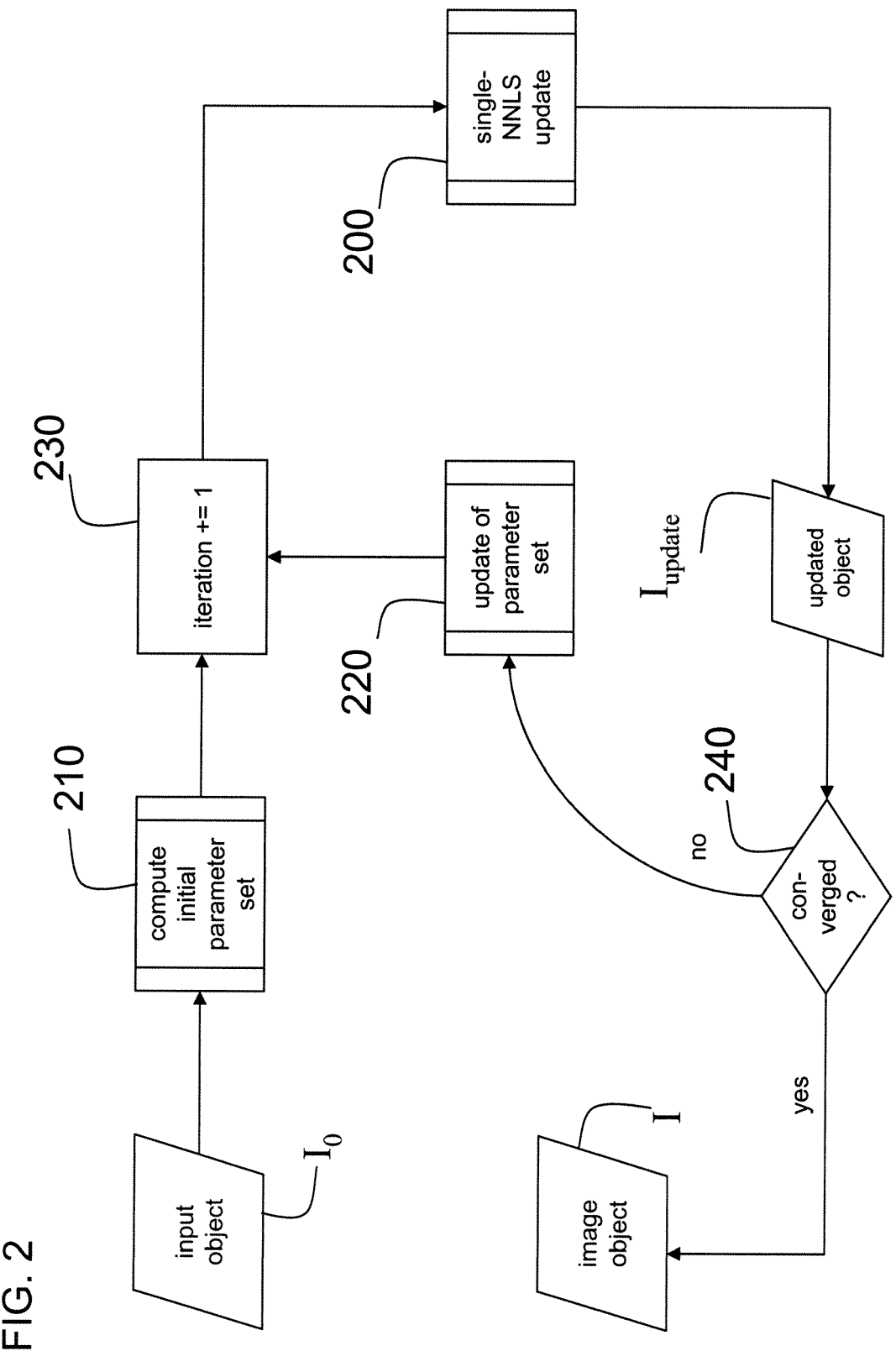
FIG. 2 is a flowchart illustrating an iterative NNLS algorithm.
Figure 6:
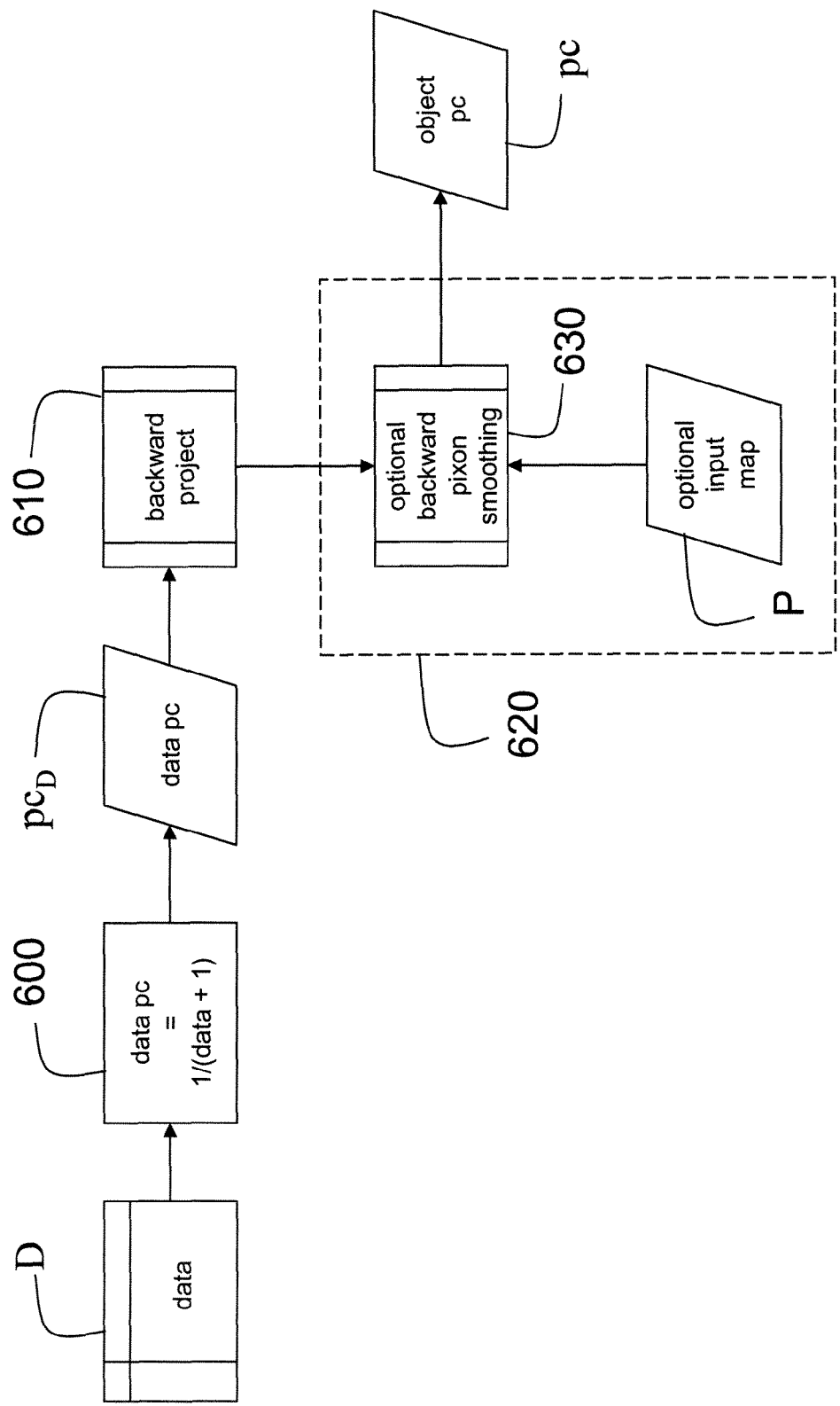
FIG. 6 is a flowchart illustrating a determination of a preconditioner.
Figure 7:
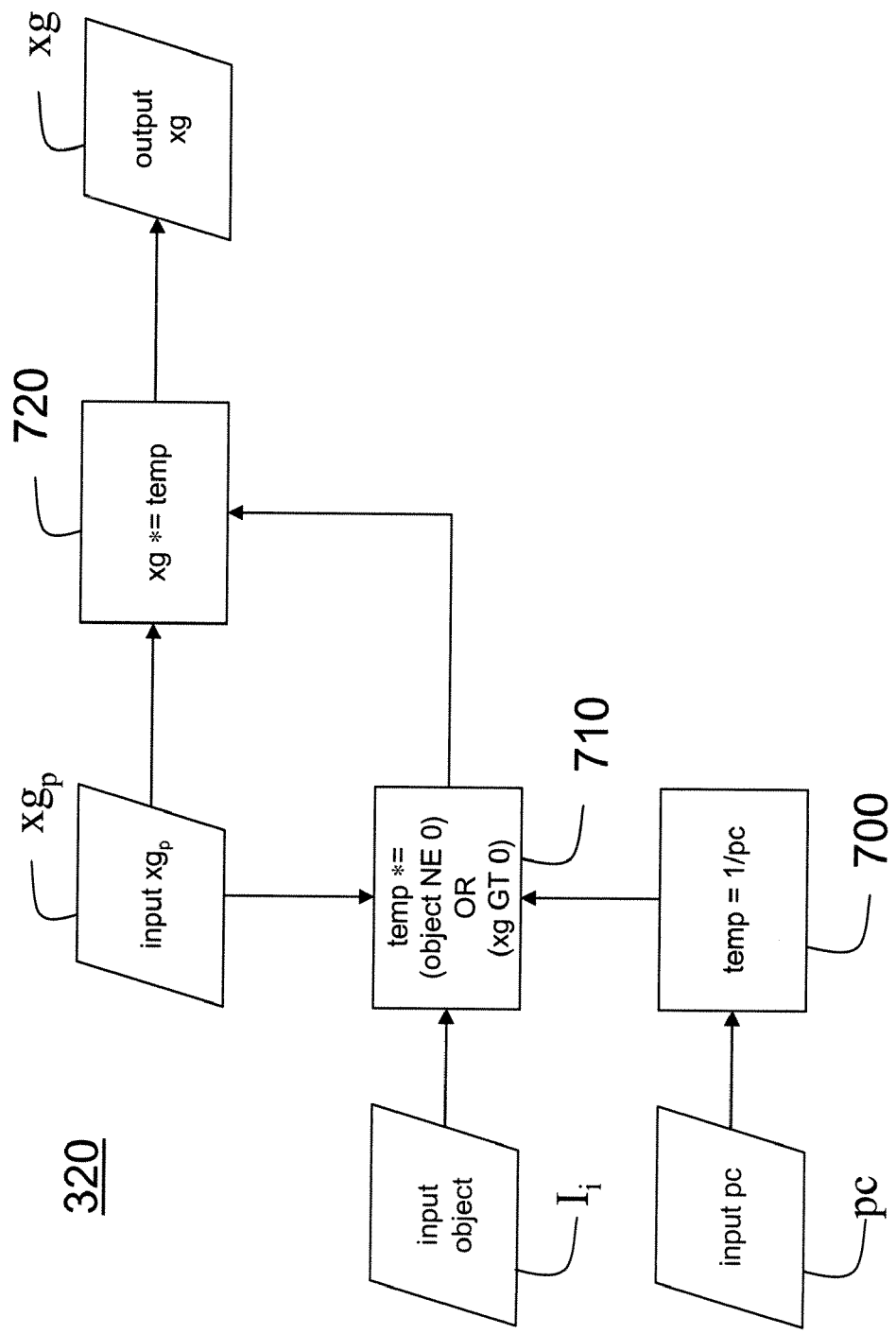
FIG. 7 is a flowchart illustrating a constraining operation of the preliminary auxiliary gradient.
Figure 8:
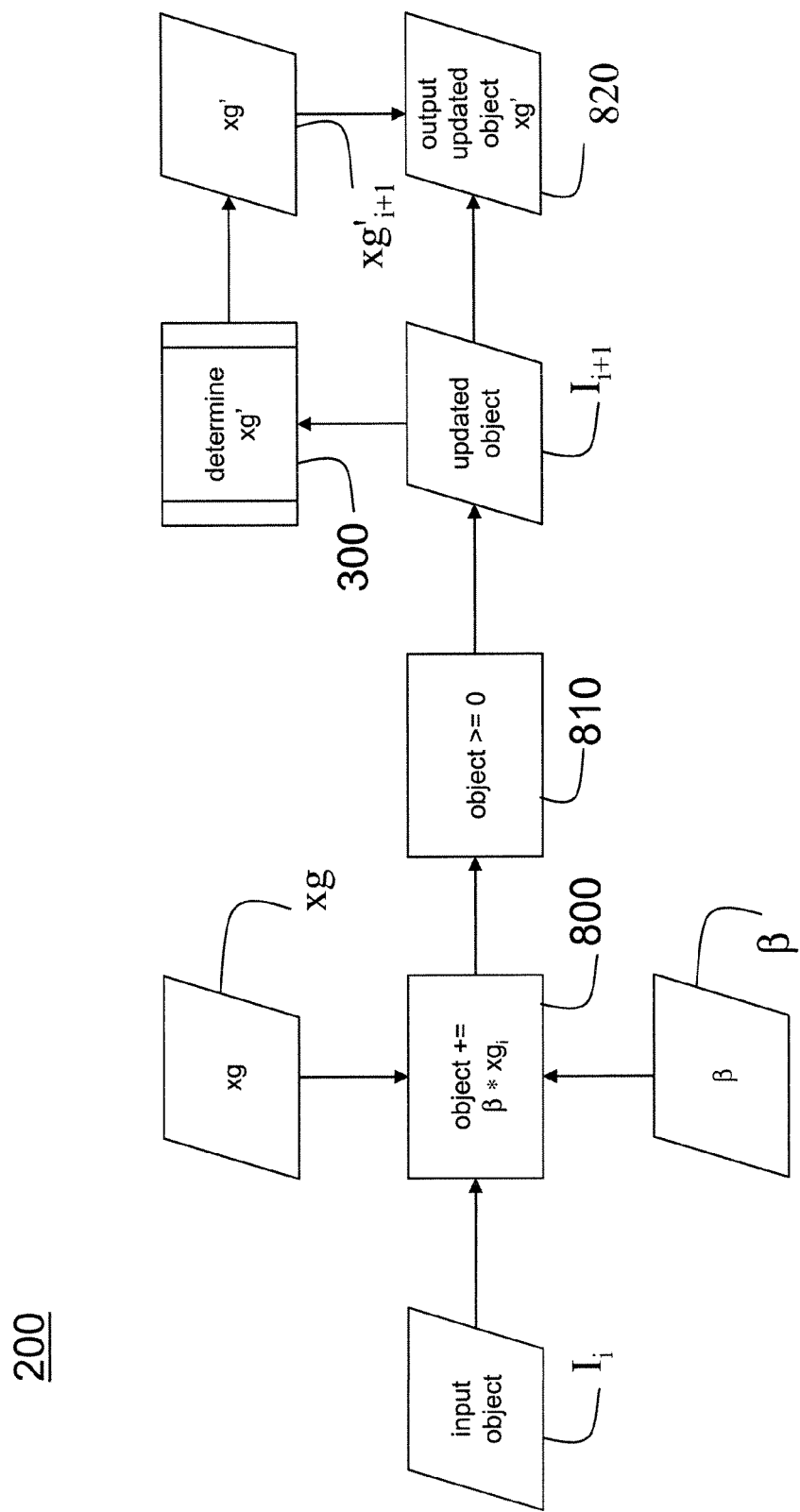
FIG. 8 is a flowchart illustrating a NNLS update operation.
Figure 9:
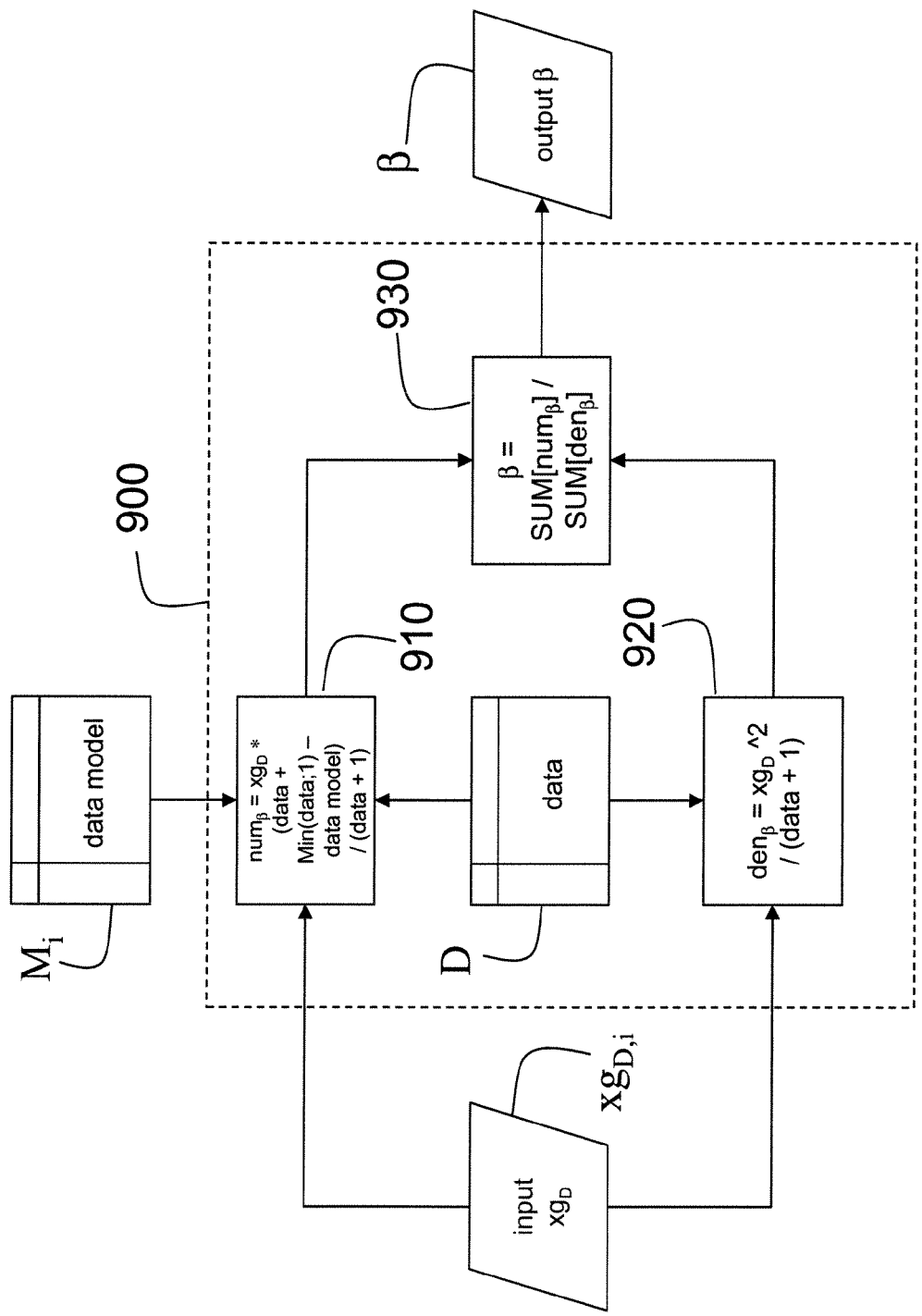
FIG. 9 is a flowchart illustrating a determination of an update factor of the NNLS update operation.

FIGS. 2 to 10 show details of an exemplary reconstruction algorithm that is based on a non-negative least square fit and uses the conjugate gradient method. FIG. 2 shows the reconstruction algorithm as an iterative algorithm that executes a single-NNLS update operation (step 200) in each iteration. Within its single-NNLS update operation (step 200), the algorithm determines an updated object $I_{update}$. FIGS. 3 to 7 describe in detail the computation of an initial set of parameters $S_0$ (step 210), some of these calculations are also used for the update of the set of parameters (step 220), which is discussed in connection with FIG. 10. FIGS. 8 and 9 illustrate the single-NNLS update operation (step 200).

In FIG. 2, the NNLS update operation (step 200) is applied within an iterative cycle, which is indicated by increasing the increment, iteration, (step 230). A convergence test (step 240) carried out in each iteration is used to determine whether to continue the iteration.

Initial Set of Parameters

Figure 3:
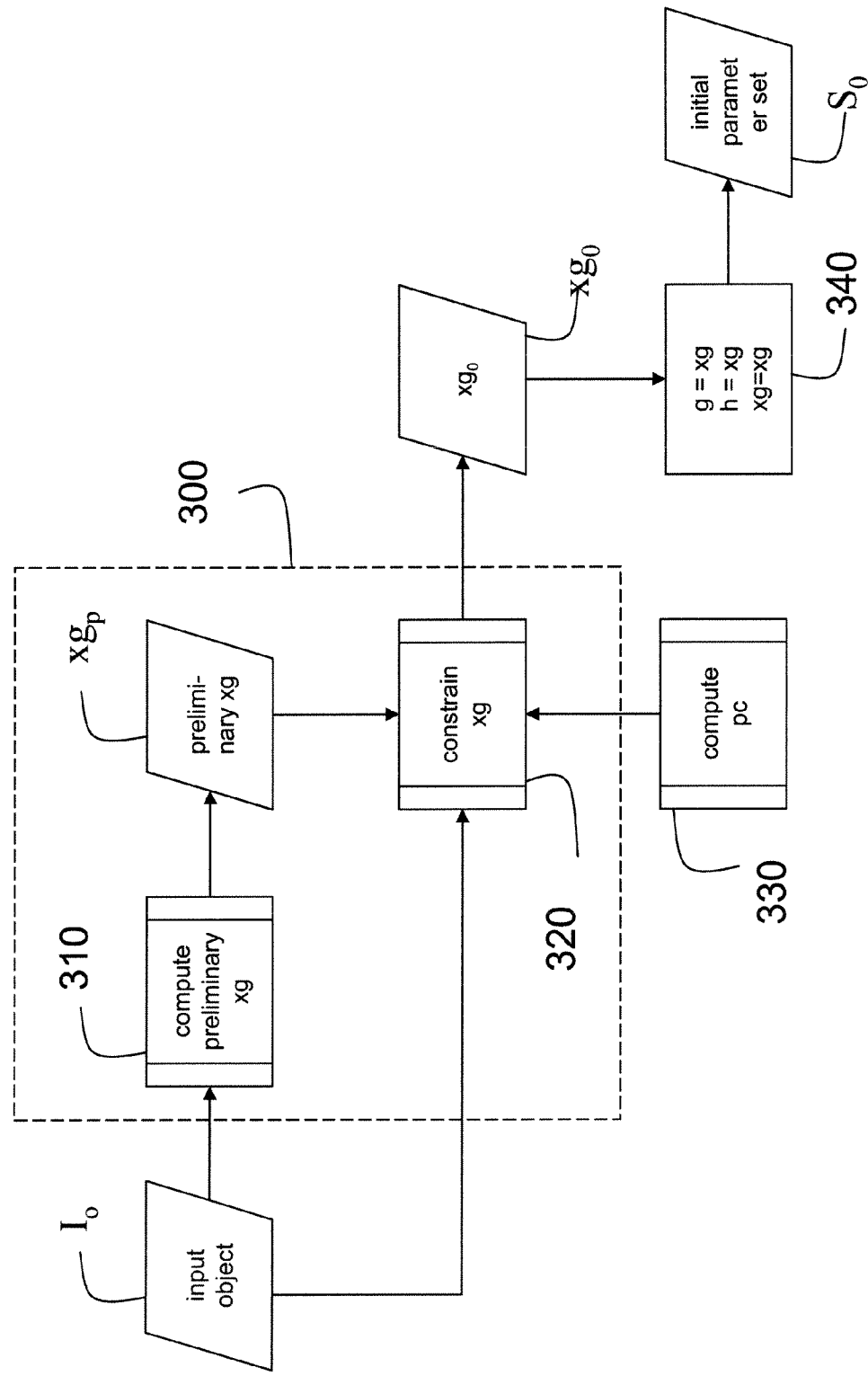
FIG. 3 is a flowchart illustrating an exemplary calculation of an initial set of parameters.

One begins the iteration by determining an initial set of parameters $S_0$ for an initial object $I_0$ (step 210), as shown in FIG. 3. The initial set of parameters $S_0$ includes an initial negative gradient $g_0$, an initial conjugate-gradient direction $h_0$ of the input object $I_0$, and an initial preliminary gradient $xg_0$. In addition the initial set of parameters $S_0$ includes a preconditioner object pc, the determination of which will be discussed in connection with FIG. 6. A specific constraint of the NNLS algorithm is the non-negativity of the input object. Accordingly, for a data point of the initial object $I_0$ with value zero, the corresponding value of the negative gradient $g_0$ is set to zero.

Based on the set of parameters $S_0$ and the initial object $I_0$, the NNLS update operation determines an updated object $I_{update}$ (step 200). In the convergence test (step 240), one compares the updated object $I_{update}$ with the initial object (or, during the iteration, with a preceding updated object) and evaluates whether a convergence parameter falls within a predetermined convergence limit. If it does, one assigns the most recent updated object $I_{update}$ to be the final image object I. If the updated object $I_{update}$ does not fulfill the convergence test, one updates the parameter set (step 220) based on the updated object $I_{update}$ and enters the next iteration.

Conjugate Gradient Method

The conjugate gradient method is based on the determination of the negative gradient g and the conjugate-gradient direction h of an input object. The negative gradient g and the conjugate-gradient direction h are objects in object space that assign to every data point in object space (hereafter an "object point") a (negative) gradient value and direction, respectively. The negative gradient g provides for each object point the direction in which the input object should be modified. One might use a multiplication factor β that determines how far one modifies the object according to the gradient.

Throughout the iteration, the negative gradient g and the conjugate-gradient direction h are updated. This update calculation is based on an auxiliary gradient xg, which is introduced as new parameter but which corresponds to the negative gradient. The auxiliary gradient xg is determined (step 300) on the basis of the current input object of the corresponding iteration and the preconditioner object pc. The preconditioner pc can help to remove a bias present in low count data. It can be determined based on the measured data set D (step 330) as described in connection with FIG. 6.

FIG. 3 illustrates the calculation of the initial set of parameters $S_0$ (step 210). One first determines an initial auxiliary gradient $xg_0$ based on the initial object $I_0$ and the preconditioner pc. The determination (step 300) includes a calculation of a preliminary auxiliary gradient $xg_p$ (step 310) and a constraining operation on the preliminary auxiliary gradient $xg_p$ (step 320), the details of which are illustrated in connection with FIGS. 5 and 7, respectively. Additional input objects for the constraining operation (step 320) are the initial object $I_0$, and the preconditioner object pc. For the initial set of parameters $S_0$, one assigns the value of the initial auxiliary gradient $xg_0$ to an initial negative gradient $g_0$ and to an initial conjugate-gradient direction $h_0$ (step 340).

Figure 10:
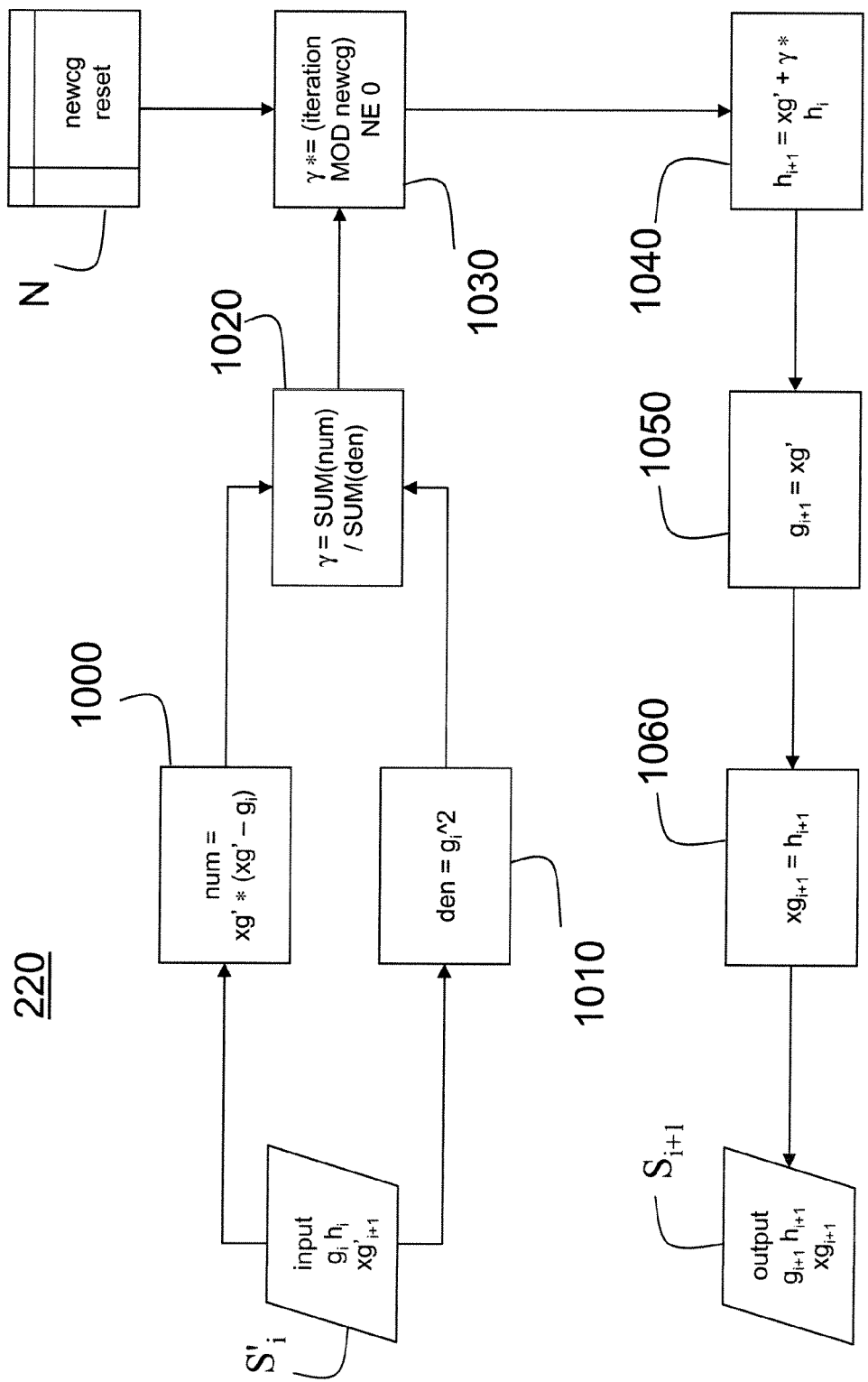
FIG. 10 is a flowchart illustrating an update of a set of parameters of the NNLS update operation.

Within the update of the set of parameters (step 220), one also uses this determination (step 300) to calculate the auxiliary gradient. In this case, the calculations of the preliminary auxiliary gradient $xg_p$ (step 310) and the constraining operation of the preliminary auxiliary gradient $xg_p$ (step 320) are based on the previously updated object $I_{update}$. However, within the update operation (step 220), one assigns the values of the negative gradient g and the conjugate-gradient direction h on the basis of the conjugate gradient method, which is illustrated in FIG. 10.

Object Space and Data Space

The NNLS algorithm uses a projection operation between object space and data space to generate projected objects that are used within the NNLS algorithm for evaluating e.g. the updated object $I_{update}$ or for calculating parameters of the single-NNLS update operation (step 200). As shown in FIG. 1, object space and data space are related to each other through the nuclear imaging system 100. This relation is modeled by the system matrix H. Thus, for the projection operation, one can use the system matrix H and its transpose $H^T$ to transform objects between object space and data space.

Figure 4:
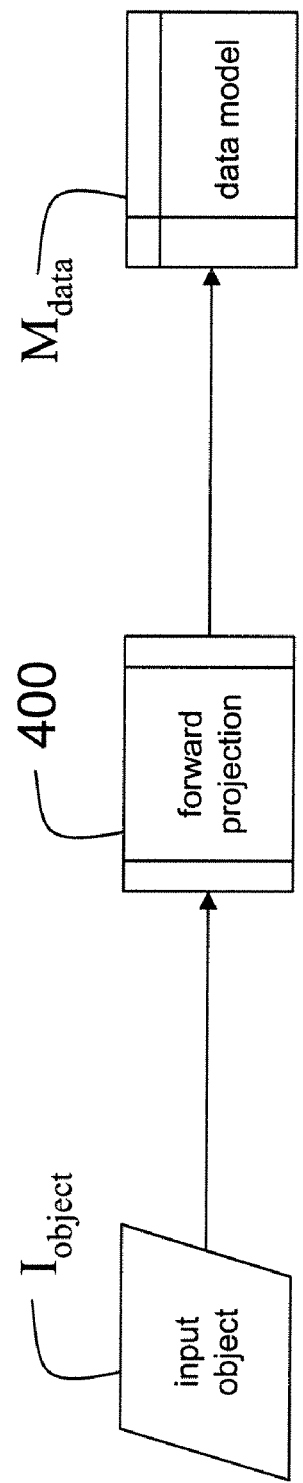
FIG. 4 is a flowchart illustrating a forward projection from object space into data space.

FIG. 4 illustrates a forward projection (step 400) that projects an input object $I_{object}$ from object space into data space to yield a data model $M_{data}$ of the input object $I_{object}$. The input object $I_{object}$ can be either an estimated object, e.g., the initial object $I_0$ or the preceding updated object $I_{update}$, or any object defined in object space.

A "forward projection" is an application of the system matrix H to an object in object space. The result of a forward projection is a "projected object" in data space. For example, projecting an estimated image $I_\alpha$ into data space results in a data model $M_i$ of that estimated image:

$$M_i = \sum_\alpha H_{i\alpha} I_\alpha$$

However, the system matrix H is rarely applied as a matrix multiplication. Instead, it is represented as a product of operators $H_n$:

$$H = H_n \otimes \ldots \otimes H_2 \otimes H_1$$

Corresponding to the forward projection, the backward projection from the data space into object space can be described as an application of the transpose $H^T$ of the system matrix H:

$$I_\alpha = \sum_i H_{\alpha i} M_i$$

The transpose $H^T$ is also rarely applied as a matrix multiplication. Instead, it is represented as a product of operators:

$$H^T = H_1^T \otimes H_2^T \otimes \ldots \otimes H_n^T$$

In the NNLS algorithm, one uses forward and backward projections, for example, when determining the auxiliary gradient xg, and specifically, when calculating the preliminary auxiliary gradient $xg_p$ and the preconditioner object pc.

Auxiliary Gradient

Figure 5:
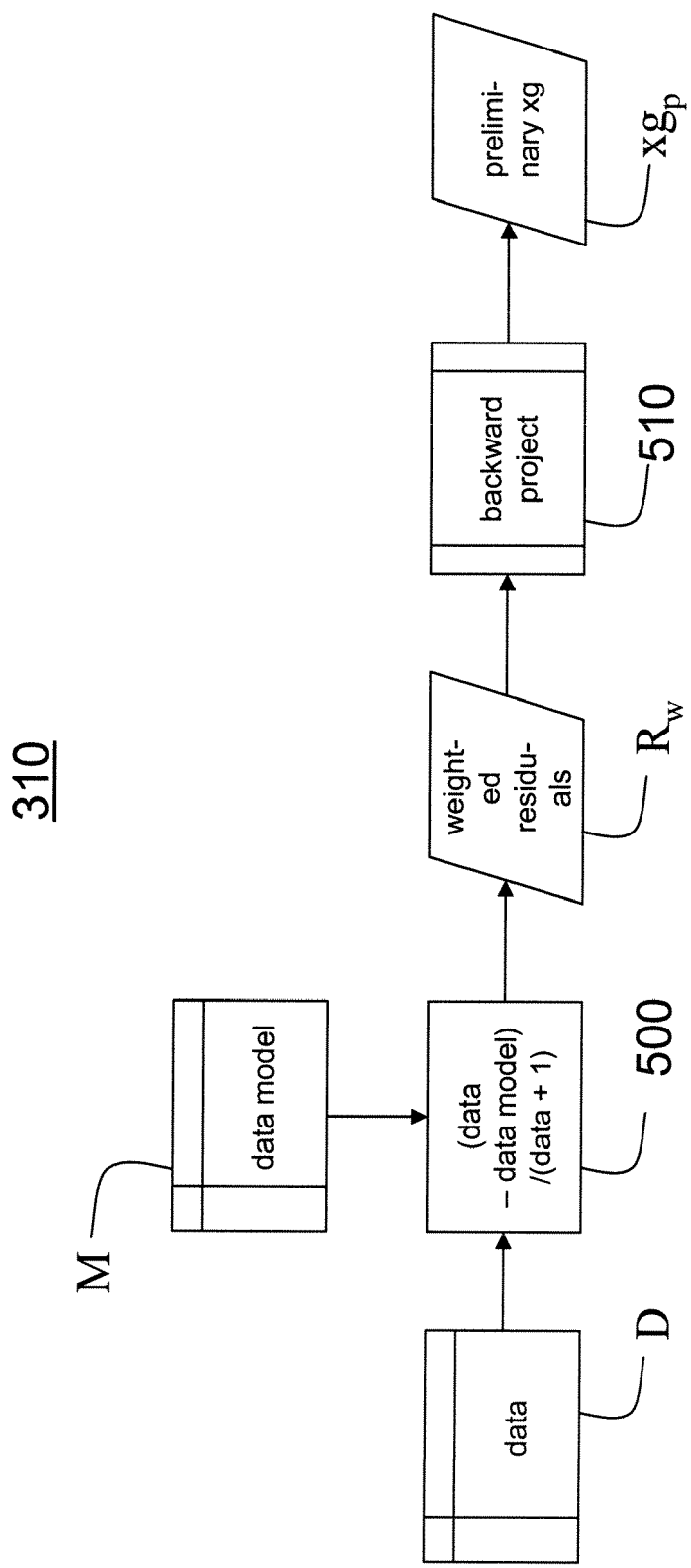
FIG. 5 is a flowchart illustrating a determination of a preliminary auxiliary gradient.

FIG. 5 shows the calculation of a preliminary auxiliary gradient $xg_p$ (step 310) that is statistically adapted to data having a Poisson statistic, e.g. due to a low count rate. The preliminary auxiliary gradient $xg_p$ is defined in object space, but it has its origin in the differences between the measured data set D and the data model M, which is defined in data space. The differences between the values of the measured data set D and those of the data model M are called the residuals. The data model M is created by forward projecting the input object of the current iteration into data space using the forward projection (step 400) as discussed in connection with FIG. 4. For the initial data set, the data model M is the forward projection of the initial object $I_0$.

When calculating the preliminary auxiliary gradient $xg_p$, one weights the residuals by the sum of the value of the measured data set D at that data point and 1 (step 500), whereby 1 is considered a statistical-data-offset number. This yields the weighted residuals $R_w$. A backward projection operation (step 510) of the weighted residuals $R_w$ results in the preliminary auxiliary gradient $xg_p$. For the calculation of the weighted residuals $R_w$, one can select the statistical-data-offset number to be a number between 0 and 10. Example values include 0.3, 0.5, 0.75, 1, 1.25, 1.5, 1.75, 2, 3, 4 and 5.

This weighting of the residuals is statistically motivated by the data set D having a Poisson statistics. For example, one can assume a Poisson statistics for nuclear imaging data. A similar weighting factor is introduced in a chi-square-gamma statistic as described in K. J. Mighell, "Parameter estimation in astronomy with Poisson-distributed data. I. The $\chi_\gamma^2$ statistic," Astrophys. J., 1999, 518: 380-393 and K. J. Mighell, "Parameter estimation in astronomy with Poisson-distributed data. II. The modified chi-square gamma statistic", 2000, arXiv:astro-ph/0007328, the contents of which are herein incorporated by reference.

The chi-square-gamma statistic of Mighell is defined by:

$$\chi_\gamma^2 = \sum_{j=1}^J \frac{(d_i + \text{Min}\{d_j, 1\} - m_j)^2}{d_j + 1},$$

wherein $d_j$ and $m_j$ are the j-th entries of the measured data set D and the data model M, respectively. J is the number of data points in data space, i.e., the number of data points in the data set D.

Optionally, a pixon smoothing operation can be applied before the forward projection (step 400) and after the backward projection (step 610). Preferably, one uses a pixon smoothing operator and its transpose. Pixon smoothing is illustrated in connection with FIGS. 13 to 20. Specifically, one may apply a forward pixon smoothing operation and a backward pixon smoothing operation that uses a pixon map P. The pixon map P depends on the image object that one uses to determine pixon kernel functions associated with each object point.

Preconditioner

An exemplary determination of a statistically adapted preconditioner object pc is illustrated in FIG. 6. In general, the preconditioner object pc is based on the measured data set D. However, in a manner similar to that described in connection with the weighting of the residuals when calculating the preliminary auxiliary gradient $xg_p$, one modifies the values of the data set when calculating a modified data-preconditioner $pc_D$ (step 600), which is defined in data space. The value of the modified data-preconditioner $pc_D$ at a data point is given by the reciprocal of the sum of the value of the data set D at that data point and 1 (step 600). A backward projection operation (step 610) of the modified data-preconditioner $pc_D$ results in the preconditioner object pc.

Optionally, a pixon smoothing operation (step 620) can also be applied to the result of the backward projection (step 610). Pixon smoothing is illustrated in connection with FIGS. 13 to 20. Specifically, one may apply a backward pixon smoothing operation (step 630) that uses a pixon map P. The pixon map P depends on the image object that one uses to determine pixon kernel functions associated with each object point.

When using a pixon smoothed preconditioner pc, one might update the preconditioner pc during the iteration by using an updated pixon map for the pixon smoothing operation.

Constraining Operation

FIG. 7 shows the constraining operation (step 320) of the preliminary auxiliary gradient $xg_p$ by a temporary object temp. To determine the temporary object temp, one first assigns the inverted values of the preconditioner object pc to the temporary field temp (step 700). Then, one modifies the temporary object temp based on the values of the current input object $I_i$ of the iteration and on the values of the preliminary auxiliary gradient xp. Specifically, one sets the values of the temporary object temp to zero for every object point that has a value of zero in the current input object $I_i$ or that has a value of the preliminary auxiliary gradient $xg_p$ less than or equal to zero (step 710).

To constrain the preliminary auxiliary gradient $xg_p$, one multiplies for every object point the value of preliminary auxiliary gradient $xg_p$ with the corresponding value of the modified temporary object temp (step 720), which yields the auxiliary gradient xg.

NNLS Update Operation

FIG. 8 illustrates the NNLS update operation (step 200) of an input image $I_i$ using the auxiliary gradient xg and a scalar factor β, the calculation of the latter is illustrated in connection with FIG. 9. In a first calculation, one adds to every value of the input object $I_i$ of the current iteration, the product of the corresponding value of the auxiliary gradient xg and the factor β (step 800). Then, one sets all negative values to zero (step 810). The result is the (non-negative) updated object $I_{i+1}$.

Within the NNLS update operation (step 200), one also determines an intermediate auxiliary gradient $xg'_{i+1}$ (step 300) on the basis of the updated object $I_{i+1}$, and the preconditioner object pc. The intermediate auxiliary gradient $xg'_{i+1}$ is used for the update of the parameter set (step 220). Thus, the output (820) of the NNLS update operation includes the updated object $I_{i+1}$ and the intermediate auxiliary gradient $xg'_{i+1}$.

FIG. 9 shows the calculation of the factor β (step 900), which is based on the measured data set D. For this calculation in data space, one forward projects the current object $I_i$ and the auxiliary gradient $xg_i$ into data space, which yields the data model $M_i$ and the data gradient $xg_{D,i}$, respectively. In a manner similar to that described in connection with the weighting of the residuals when calculating the preliminary auxiliary gradient $xg_p$, one uses a modified weight when calculating a numerator $num_β$ and a denominator $den_β$ for each data point (steps 910 and 920).

The numerator $num_β$ for a data point is the product of the value of the data gradient $xg_{D,i}$ and a modified residual, i.e. the differences between the sum of the value of the measured data set D and the maximum of the value of the data set and one, and the value of the data model M, and the reciprocal value of the sum of the value of the measured data set D at that data point and one (or a statistical data-offset-number). Similarly, the denominator $den_β$ for a data point is the product of the square of the value of the data gradient $xg_{D,i}$, and the reciprocal of the sum of the value of the measured data set D at that data point and one (or a statistical data-offset-number). Instead of the value one, the statistical data-offset-number can be also applied for the maximum evaluation.

The factor β is defined as the quotient of the sum over the numerators $num_β$ and the sum over the denominators $den_β$ (step 930), wherein the sums are executed over all data points.

Parameter Update

Before entering a next iteration, one updates the parameter set (step 220) as shown in FIG. 10. The updated parameter set is used within the next NNLS update operation to update the input object of that iteration. An input set of parameters $S'_i$ includes the preceding negative gradient $g_i$, the preceding conjugate-gradient direction $h_i$, and the intermediate auxiliary gradient $xg'_{i+1}$. Based on these parameters, one calculates, in object space, a numerator $num_γ$ and a denominator $den_γ$ for each data point (steps 1000 and 1010). The numerator $num_γ$ for a data point is the product of the value of the intermediate auxiliary gradient $xg'_{i+1}$ and the difference between that value and the corresponding value of the negative gradient $g_i$. The denominator $den_γ$ for a data point is the square of the value of the negative gradient $g_i$.

Then, one calculates a scalar factor γ that is defined as the quotient of the sum over the numerators $num_γ$ and the sum over the denominators $den_γ$ (step 1020), wherein the sums are executed over all data points. The parameter γ is used to optimize the convergence. Typically, conjugate gradient methods reset the set of parameters after a preset number N of iteration steps. In FIG. 10, such a reset is indicated by evaluating the current value of the parameter iteration with respect to that preset number N (step 1030).

For the updated set of parameters $S_{i+1}$, one determines the updated conjugate-gradient direction $h_{i+1}$, to be the sum of the intermediate auxiliary gradient $xg'_{i+1}$ and the product of the factor γ and the preceding conjugate-gradient direction $h_i$ (step 1040). Furthermore, one assigns the intermediate auxiliary gradient $xg'_{i+1}$ to be the updated negative gradient $g_{i+1}$ (step 1050). Finally, the new auxiliary gradient $xg_{i+1}$ is set to be identical to the updated conjugate-gradient direction $h_{i+1}$, (step 1060).

FIGS. 11-22 describe details of various modifications of the NNLS algorithm.

Subset Operation

Figure 11:
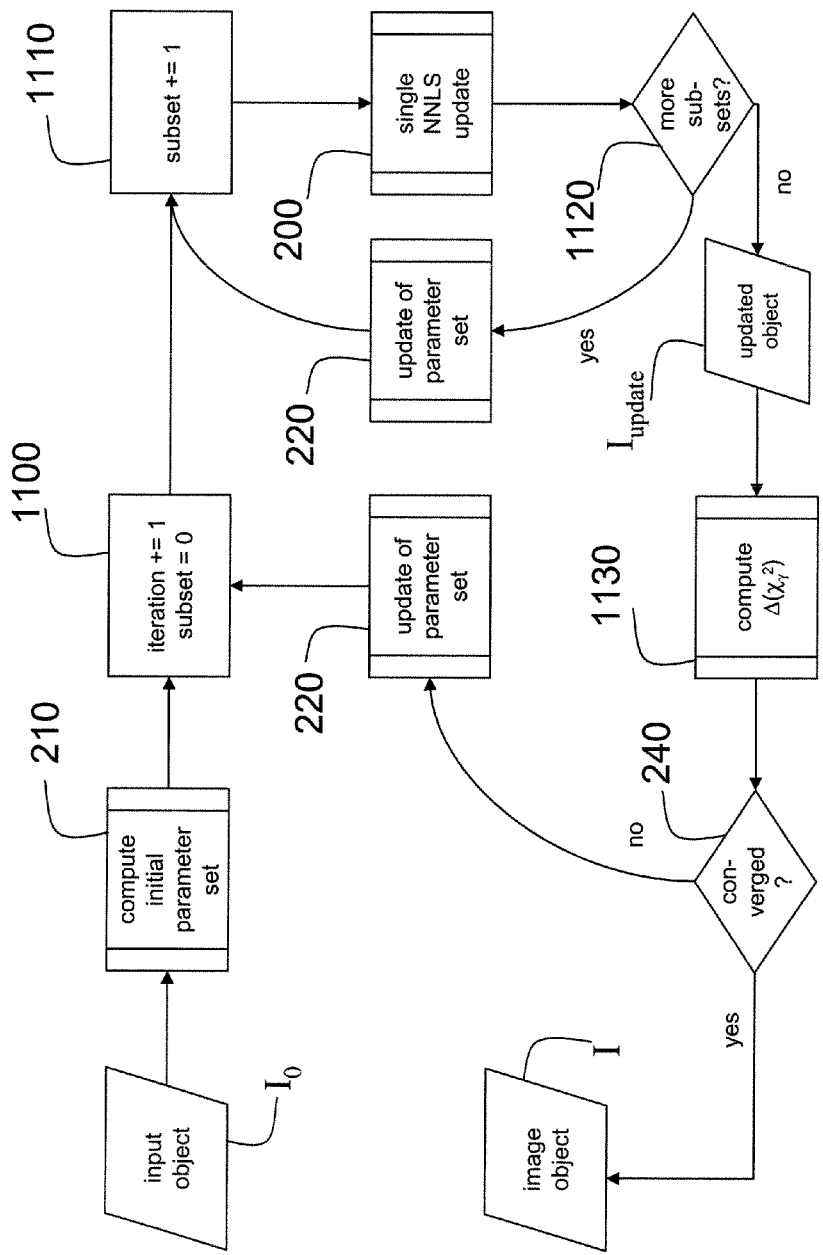
FIG. 11 is a flowchart illustrating an iterative NNLS algorithm using subsets and a convergence test.

FIG. 11 illustrates two modifications of the algorithm as shown in FIG. 2 that can be applied independent of each other.

The first modification is the introduction of a subset-loop. The subset-loop is similar to the subset of an ordered subset expectation maximization algorithm (OSEM algorithm), which is described, for example, in H. M. Hudson and R. S. Larkin, "Accelerated image reconstruction using ordered subsets of projection data," IEEE Transactions on Medical Imaging, vol. 13, no. 4, pp. 601-609, 1994, the contents of which are herein incorporated by reference.

Within a subset-based algorithm, an iteration step is defined as a single pass through all the subsets, in which for each subset, the current estimate is used to initialize application of the expectation maximization with the data subset. Thus, the subset-loop takes place during the iteration process (indicated by the increase of the iteration counter, iteration and resetting a subset counter (step 1100)). Within each iteration step, a single NNLS update (step 200) is calculated for a series of subsets of the data set D as indicated by incrementing the subset counter (step 1110). The NNLS update (step 200) is followed by a test to determine whether all subsets were considered (step 1120). After completing an iteration step, i.e., after considering all subsets, a second test determines whether another iteration is necessary (step 240). If no further iteration is necessary, the iteration is stopped and the currently calculated object $I_{update}$ is assigned as the output of the reconstruction, i.e. as the image object I.

Convergence Test

The second modification is the introduction of a computation of a statistically motivated convergence-criterion, $Δ(χ_γ^2)$ (step 1130). The convergence-criterion, $Δ(χ_γ^2)$, is based on the chi-square-gamma $(χ_γ^2)$ statistic, which is discussed above in connection with the calculation of the auxiliary gradient xg.

The chi-square-gamma statistic is used for determining the quality of an estimated data model within a reconstruction algorithm. The statistic is especially well-suited for nuclear imaging, and is therefore used to determine the convergence-criterion for the iterations of the NNLS algorithm. Thus, the iterations of the algorithm are controlled based on a statistic that is well-behaved for the low count data associated with nuclear imaging.

Figure 12:
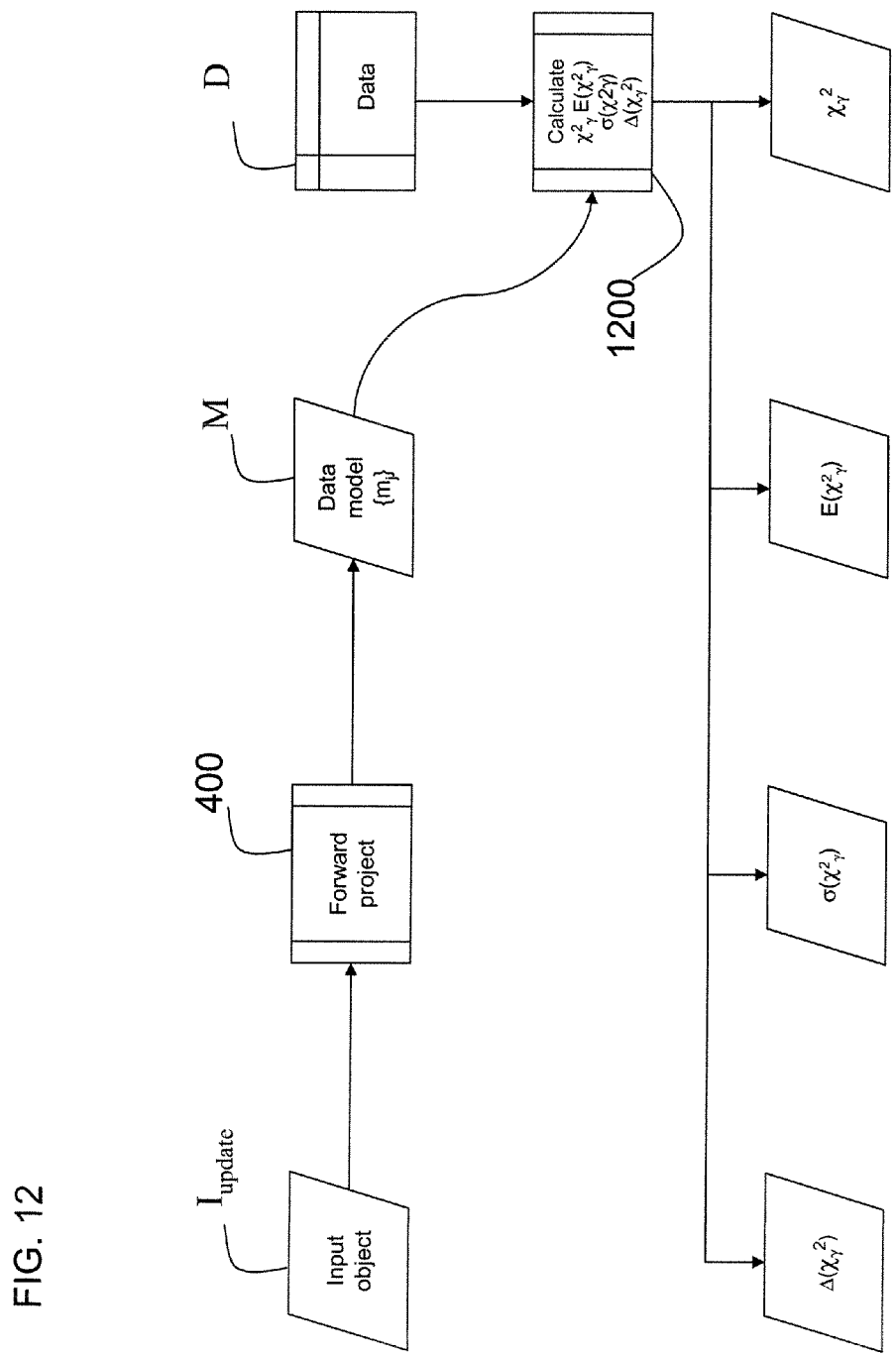
FIG. 12 is a flowchart illustrating a calculation of a convergence-criterion

The calculation of the convergence-criterion, $Δ(χ_γ^2)$, is illustrated in FIG. 12. For the calculation (step 1200) of the convergence-criterion, $Δ(χ_γ^2)$, and of statistics associated to the $χ_γ^2$-statistic, the entries $d_j$ of the data set D are retrieved. The entries $m_j$ of the data model M corresponding to the updated object $I_{update}$ are generated by forward projecting the updated object $I_{update}$ into data space. Examples of statistics include the standard deviation $σ(χ_γ^2)$ and the expectation value $E(χ_γ^2)$ of the $χ_γ^2$-statistic, which are given by the following equations:

$$\chi_\gamma^2 = \sum_{j=1}^{J} \frac{(d_i + \text{Min}\{d_j, 1\} - m_j)^2}{d_j + 1} \quad (1)$$

$$\sigma(\chi_\gamma^2) = \sqrt{\sum_{j=1}^{J} \left[ \begin{array}{c} m_j^3 e^{-m_j}[Ei(m_j) - \gamma_{EM} - \ln(m_j) + 4] - m_j^2 - m_j \\ + e^{-m_j}[-2m_j^2 + 2m_j + 1] + e^{-2m_j}[-m_j^2 + 2m_j - 1] \end{array} \right]} \quad (2)$$

$$E(\chi_\gamma^2) = \sum_{j=1}^{J} (1 + e^{-m_j}(m_j - 1)) \quad (3)$$

where $d_j$ is the value of an entry j of the data set D, $m_j$ is the value of an entry j of the data model M, and $\text{Min}\{m_j, 1\}$ is the minimum of $d_j$ and 1.

The convergence-criterion, $\Delta(\chi_\gamma^2)$, can then be defined by $$\Delta(\chi_\gamma^2) = (\chi_\gamma^2)_{iteration-1} - (\chi_\gamma^2)_{iteration}. \quad (4)$$

The convergence-criterion, $\Delta(\chi_\gamma^2)$, is used to control the iterative calculation of the NNLS algorithm by testing whether the updated object $I_{update}$ has sufficiently converged (step 240). When calculating the convergence-criterion, $\Delta(\chi_\gamma^2)$, one can consider the complete data model of the updated object $I_{update}$.

In some applications, only a portion of the image is of interest. In such cases, it is desirable to halt the iteration when that portion of the image, or "region of interest," attains some level of quality. Thus, one considers the selection of a region of interest, when calculating the convergence-criterion, $\Delta(\chi_\gamma^2)$, at each iteration. The region of interest can be selected manually, automatically or it can be predefined for specific operation modes of the nuclear imaging systems 100.

A forward projection projects the region of interest forward to give weights $w_j$ in data space. These weights $w_j$ are included in the calculation of the statistical values of the $\chi_\gamma^2$-statistic within the region of interest. The modified equations (1')-(3') are:

$$\chi_\gamma^2 = \sum_{j=1}^{J} w_j \frac{(d_j + \text{Min}\{d_j, 1\} - m_j)^2}{d_j + 1} \quad (1')$$

$$\sigma(\chi_\gamma^2) = \sqrt{\sum_{j=1}^{J} w_j \left[ \begin{array}{l} m_j^3 e^{-m_j}[Ei(m_j) - \gamma_{EM} - \ln(m_j) + 4] - m_j^2 - m_j \\ + e^{-m_j}[-2m_j^2 + 2m_j + 1] + e^{-2m_j}[-m_j^2 + 2m_j - 1] \end{array} \right]} \quad (2')$$

$$E(\chi_\gamma^2) = \sum_{j=1}^{J} w_j(1 + e^{-m_j}(m_j - 1)) \quad (3')$$

In the equation, each entry of the data model M is assigned a weight $w_j$. The convergence-criterion, $\Delta(\chi_\gamma^2)$, is again defined according to equation (4). However, the resulting quality is weighted toward the region of interest.

For the convergence test (step 240), one compares the convergence-criterion, $\Delta(\chi_\gamma^2)$, with convergence limits. These convergence limits can be selected manually, automatically, or they can be predefined for specific operation modes of the nuclear imaging systems 100. Examples for such convergence criteria include an absolute tolerance limit ABS and a relative tolerance limit REL.

For example, one can define as a condition for a sufficient convergence of the updated objects that the convergence-criterion, $\Delta(\chi_\gamma^2)$, be larger than the negative value of the absolute tolerance limit and smaller than the maximum of the absolute limit and the product of the relative tolerance limit with the expectation value $E(\chi_\gamma^2)$ of the $\chi_\gamma^2$-statistic:

$$\Delta\chi_\gamma^2 > -ABS$$

$$\Delta\chi_\gamma^2 < \text{Max}\{ABS; REL \cdot E(\chi_\gamma^2)\}$$

The final image object is then assigned to be the last updated object $I_{update}$, for which $\Delta\chi_\gamma^2 > -ABS$ was fulfilled. However, one may not accept an object for which the convergence-criterion, $\Delta(\chi_\gamma^2)$, has a comparatively large negative value.

Alternatively, or in addition, to the control by the convergence-criterion, $\Delta(\chi_\gamma^2)$, one can control the iterative NNLS algorithm with a stop-criterion that is based on the $\chi_\gamma^2$-statistic and statistically characterizes the quality of the updated object $I_{update}$. The stop-criterion, $Q(\chi_\gamma^2)$, can be defined by $$Q(\chi_\gamma^2) = \frac{\chi_\gamma^2 - E(\chi_\gamma^2)}{\sigma(\chi_\gamma^2)}. \quad (4)$$

The stop-criterion, $Q(\chi_\gamma^2)$, is then used to stop the iterative calculation as soon as a predefined tolerance threshold is reached.

Pixon Method

The NNLS algorithm can be combined with a pixon method. The pixon smoothing is exemplary for smoothing operations that constrain the reconstruction. Instead of a pixon smoothing operation, one could smooth by constraining operations that are based on Fourier filtering, application of a Wiener filter, wavelet filtering and/or application of a fixed filter. For such a constraining operation, the associated filter functions can be stored in a constraining map corresponding to a pixon map P. An overview of different smoothing methods is given in R. C. Puetter et al., "Digital Image Reconstruction: Deblurring and Denoising," Annu. Rev. Astro. Astrophys., 2005, 43: 139-194.

Within this application "pixon" is used to indicate that a term, method, object etc. refers to the pixon method, and the use of variable shapes (areas or volumes) when smoothing an image object. For example, the assigned shapes are defined by pixon kernel functions, and the pixon map P stores the information about which of the pixon kernel functions is assigned to which of the object points.

Figure 13:
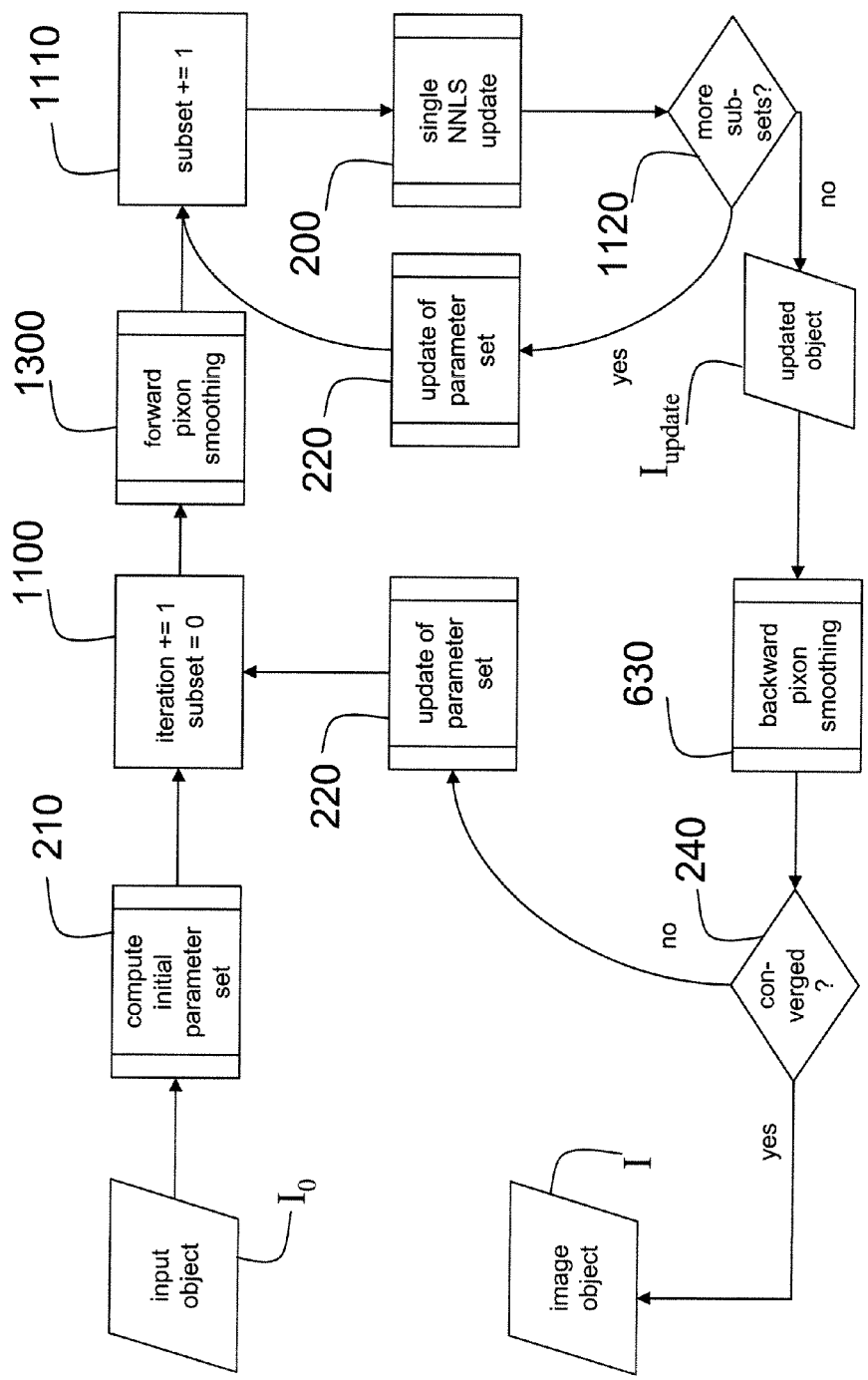
FIG. 13 is a flowchart illustrating a first example of an iterative NNLS algorithm using pixon smoothing.

The pixon method is based on pixon smoothing operations that are applied to objects in object space. In connection with FIG. 6, the optional pixon backward smoothing operation (step 600) has been mentioned. Alternatively, or in addition, one can apply a pixon smoothing operation to an updated image object $I_{update}$. FIG. 13 illustrates a first example of using pixon smoothing within an algorithm that is, for example, similar to the one shown in FIG. 11. However, pixon smoothing can be incorporated into any embodiment of the discussed NNLS algorithm, e.g., with or without a subset-loop and with or without a convergence control.

In FIG. 13, a pixon forward smoothing operation (step 1300) is introduced before the subset-loop is entered and a pixon backward smoothing operation (step 630) is introduced subsequent to the subset-loop. Each of the pixon smoothing operations, which will be described in more detail in connection with FIGS. 14 to 17, uses the pixon map P.

The pixon method is spatially adaptive, as the pixon smoothing operation depends on the values of the measured data set that correspond to that object point. To every object point, one assigns a pixon kernel function, which is the basis for the pixon smoothing operation. Within the pixon reconstruction, the pixon map P defines which of the pixon kernel functions is assigned to each of the object points.

The pixon method is especially suited for reconstructing an object from a measured data set with a low number of counts and an unavoidable noise contribution. Such data sets are produced, for example, with medical imaging techniques in nuclear medicine, which produce 3D images of, for example, a functional process in a patient's body by using nuclear properties of matter. Examples of such imaging techniques are Positron Emission Tomography (PET) and Single Photon Computed Tomography (SPECT).

Pixon Map Determination

The pixon method includes a search for the broadest possible pixon kernel functions that define the largest shape for the smoothing operation at each object point and that together provide an adequate fit of an object, e.g. the 3D image object I, to the data set D. The pixon kernel functions are determined on the basis of a minimum complexity approach and are used for the pixon smoothing operation. An exemplary determination of a pixon map P for the case of low count data having a Poisson statistics is described in the co-pending U.S. patent application entitled "Determining a pixon map for image reconstruction," by A. Yahil and H. Vija, filed on even date herewith, the contents of which are herein incorporated by reference. The information about the selected pixon kernel functions is stored in the pixon map P, which assigns a pixon kernel function to each object point.

Figure 14:
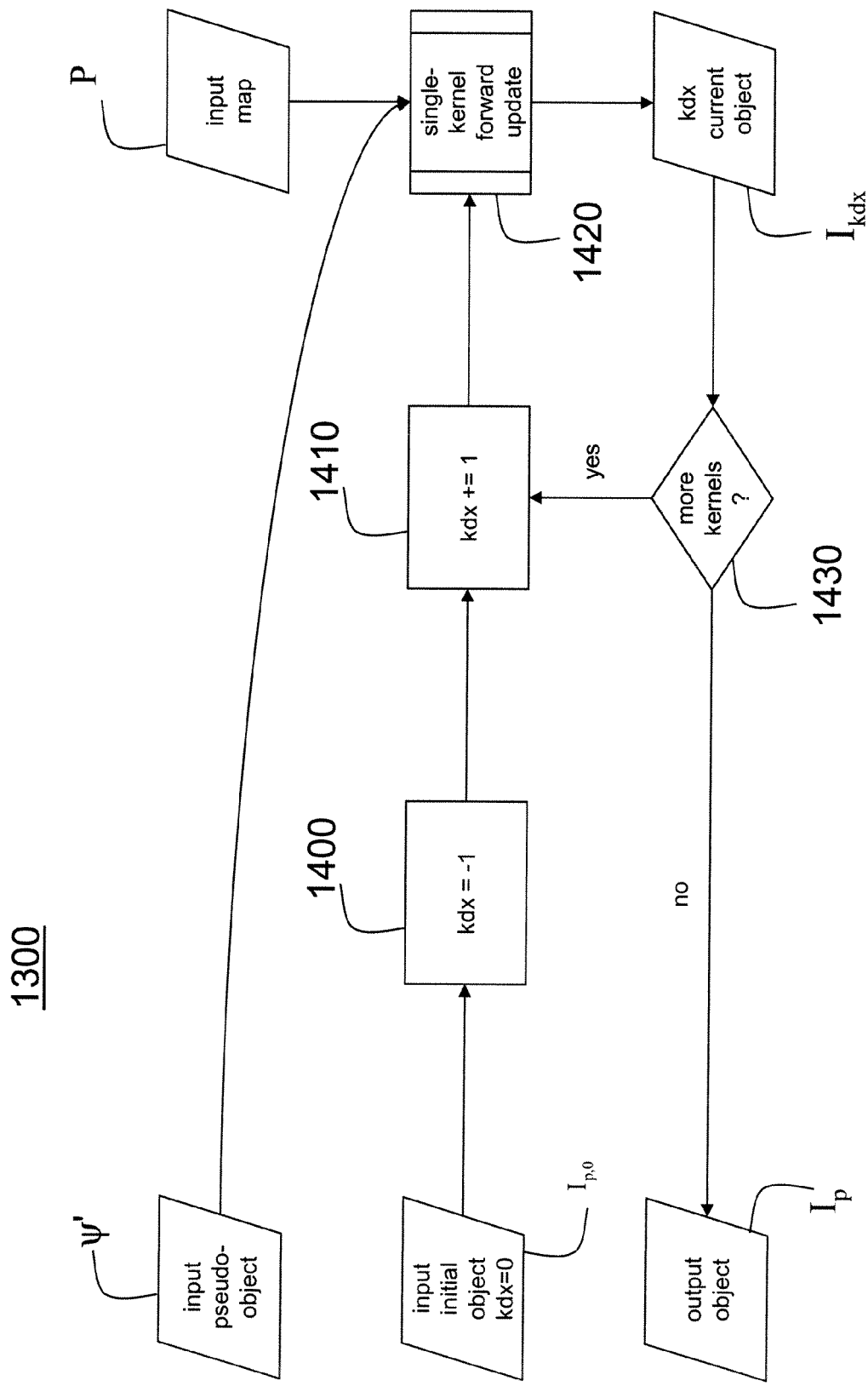
FIG. 14 is a flowchart illustrating an example of a forward pixon smoothing operation.
Figure 15:
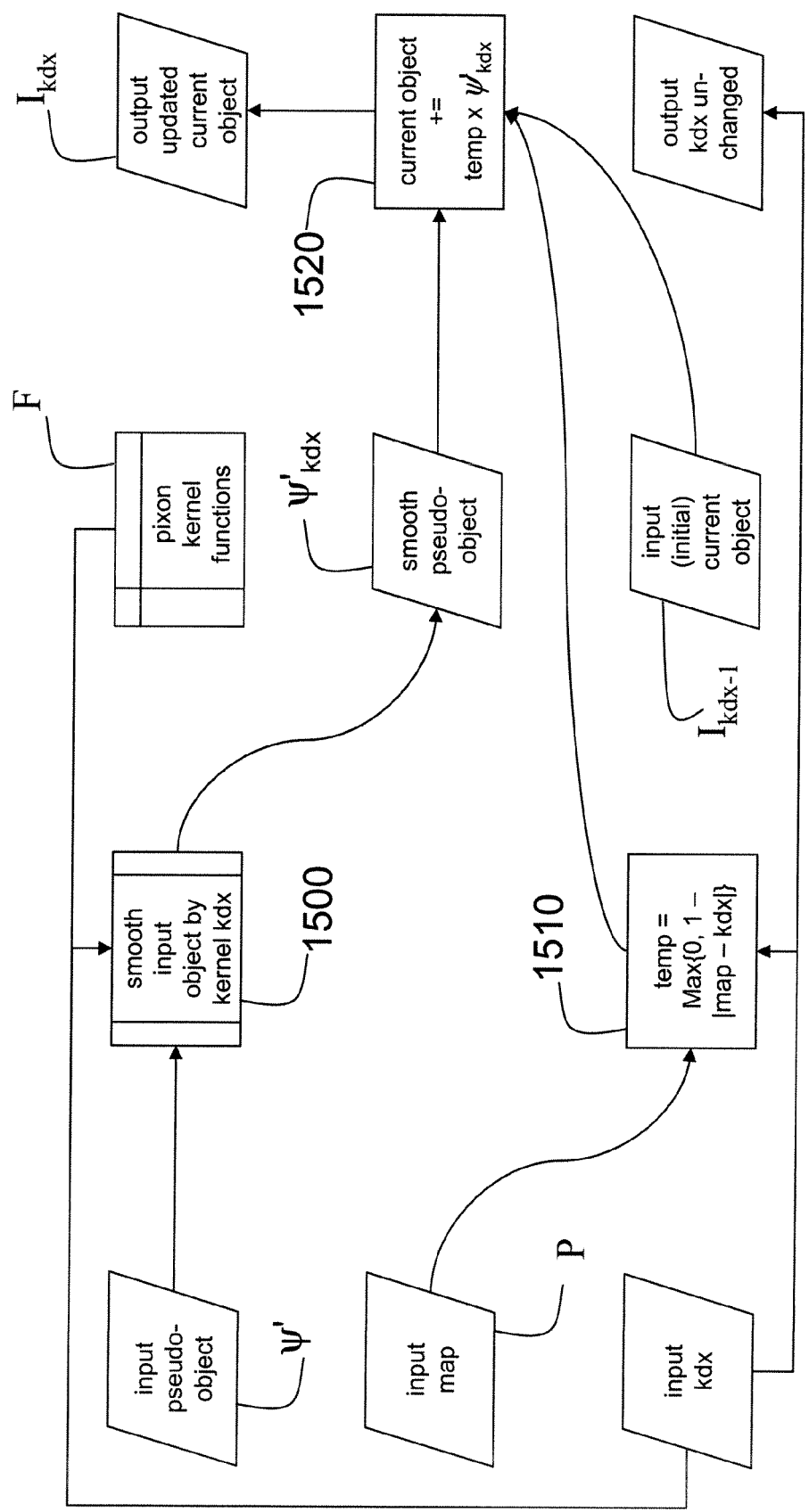
FIG. 15 is a flowchart illustrating a single-kernel function forward update of the forward pixon smoothing operation.
Figure 16:
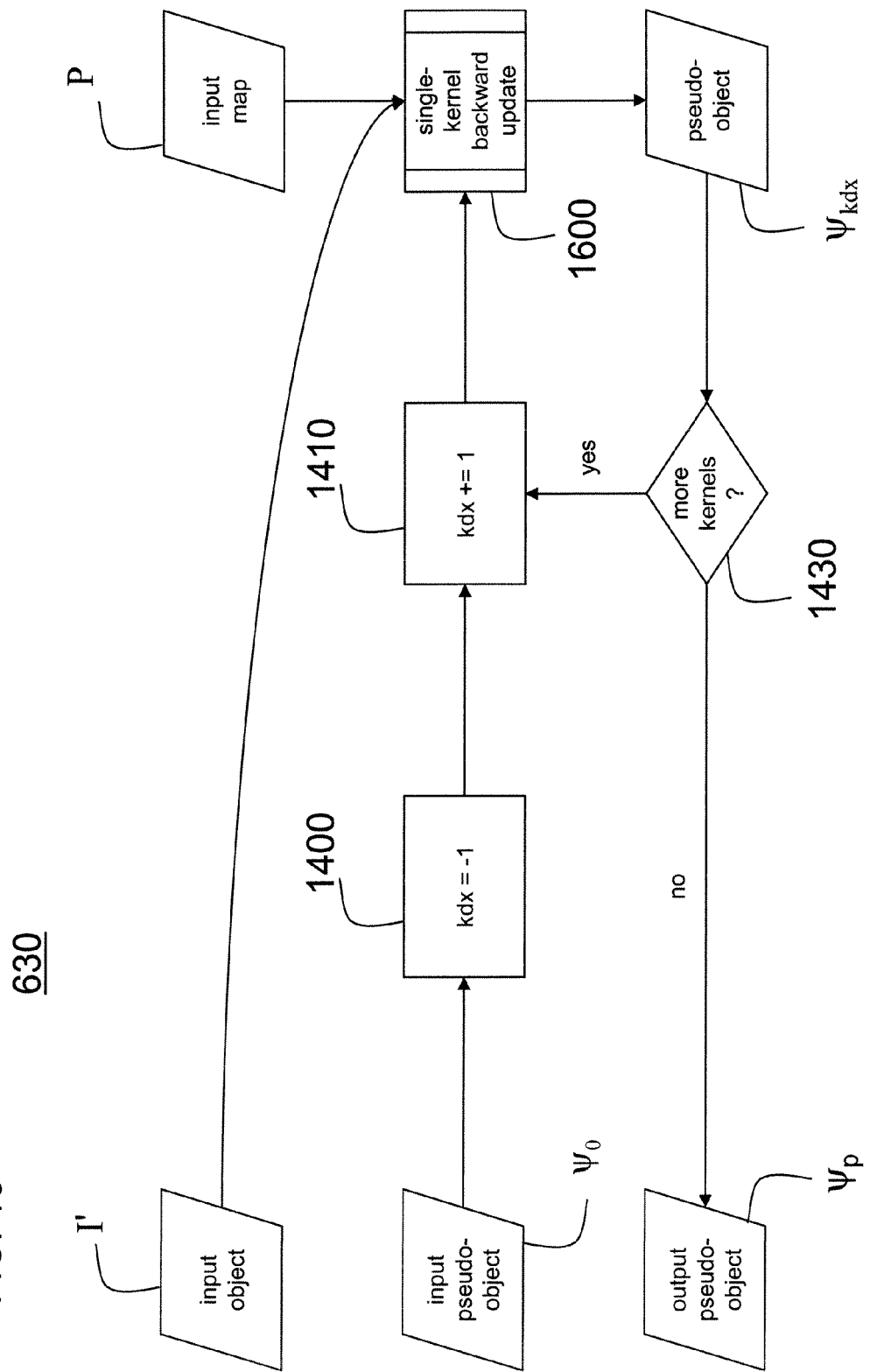
FIG. 16 is a flowchart illustrating an example of a backward pixon smoothing operation.
Figure 17:
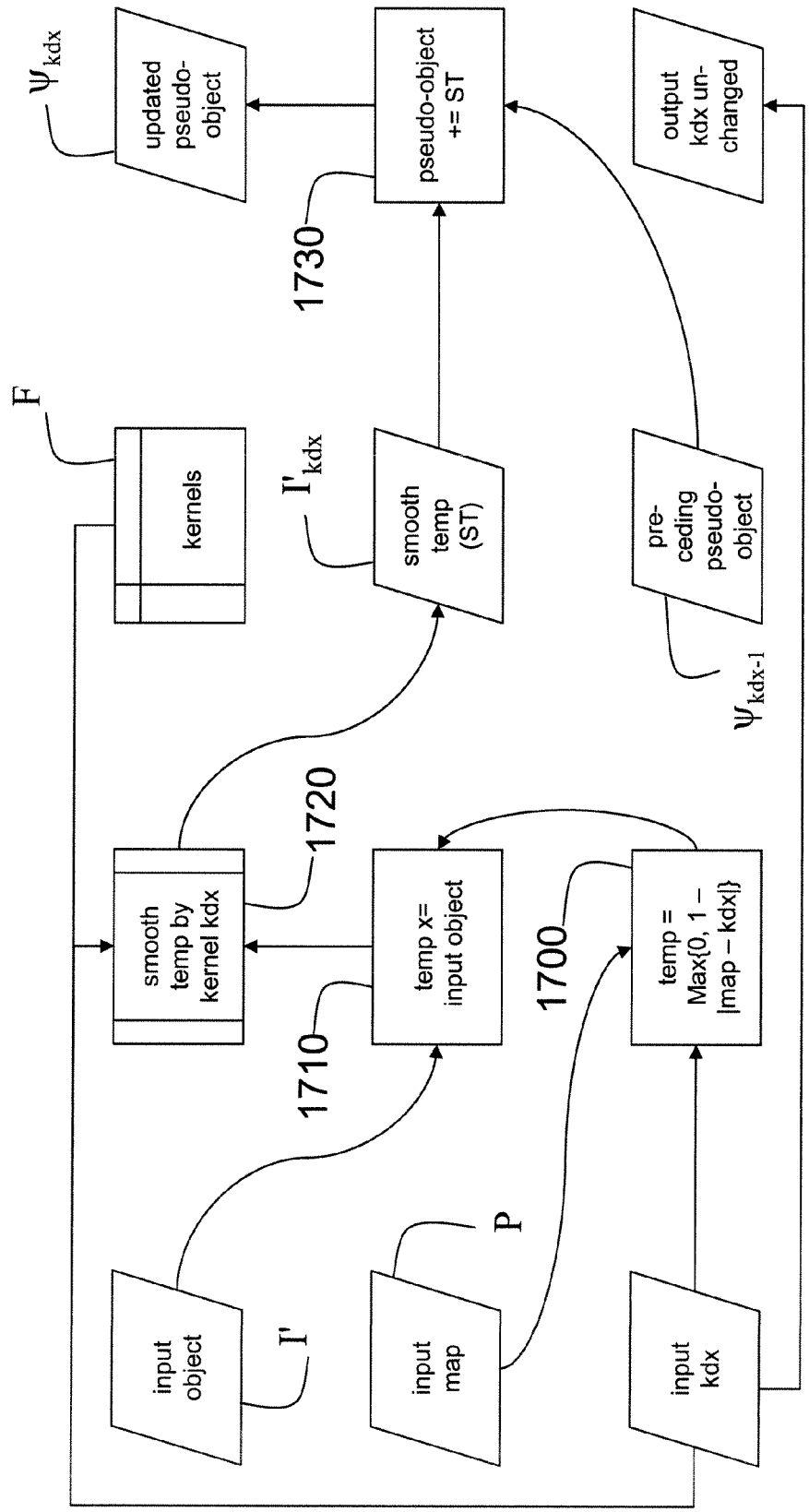
FIG. 17 is a flowchart illustrating a single-kernel function backward update of the backward pixon smoothing operation.

With respect to FIG. 13, the forward pixon smoothing operation (step 450), which is described in more detail in connection with FIGS. 14 and 15, is applied to the input object at the beginning of the iteration before the loop over the subsets is entered. The backward pixon smoothing operation (step 460), which is described in more detail in connection with FIGS. 16 and 17, is applied when the loop over the subsets is completed.

Pixon Smoothing

Pixon smoothing can be viewed as averaging values of an object over a specific volume (in 3D) defined by the pixon kernel function. The smoothing operation can be written as a matrix operation using a pixon kernel operator K, such that the (smoothed) image object $I_\alpha$ is given by applying the pixon kernel operator K to a pseudo-image object $\Psi'$:

$$I_\alpha = \sum_\beta K_{\alpha\beta} \psi'_\beta$$

"Pseudo" indicates that the smoothing operation can be understood as a transformation (using the pixon kernel operator K) from a (pseudo-)object space, i.e. the pre-pixon smoothing space, to the object space of the 3D image object I. Applying the transpose operator of the pixon kernel operator, $K^T$, then projects from the object space back into the pseudo-object space.

In many cases, the smoothing operation is a convolution operation given by:

$$I_\alpha = \sum_\beta K_{\alpha-\beta} \psi'_\beta$$

Convolutions can be calculated, for example, by a direct summation for small pixon kernel functions and by fast Fourier transforms (FFTs) for large pixon kernel functions. If the pixon kernel function can be factorized, a product of operators can be applied to simplify the calculation.

Pixon kernel functions can be discrete or continuous. They are defined over a volume that surrounds an object point. The volume can be limited (over one or more object points) or extend over the complete object space. Examples for 3D pixon kernel functions include a Gaussian function, an inverted paraboloid, or a function $f(x;\beta)=(1+\beta x^2)^{-1/\beta^2}$, which approximates the Gaussian and parabolic functions for $\beta$-values of zero or infinity, wherein the parameter x can represent the radius or depend on the direction.

The shapes of the kernel functions can be symmetric, or they can be adjusted in response to a form prevailing in the image object I. Within the shape of the pixon kernel functions, one can weigh the contribution of an object point. A limiting case of a pixon kernel function is the delta-function, in which the pixon smoothed object and the unsmoothed object are identical.

Forward Pixon Smoothing

During the forward pixon smoothing operation (step 1300), one repetitively smoothes each object point of the pseudo-object $\Psi'$, in this case the input object of the current iteration, over pixon kernel functions, which are specifically assigned to each object point by the pixon map P. In accordance with the above discussed use of the pixon kernel operator K, an input object that is provided to a forward pixon smoothing operation is called a "pseudo-object" $\Psi'$.

FIG. 14 shows the details associated with the pixon forward smoothing operation (step 1300) applied to the pseudo-object $\Psi'$. Using the pixon map P, one builds a pixon smoothed object $I_p$ by smoothing each object point of the pseudo-object $\Psi'$ with whichever pixon kernel function the pixon map P assigns to that object point. Thus, the pixon smoothed object $I_p$ for the loop over the subset is composed by smoothing the pseudo-object $\Psi'$. This smoothing includes iteratively considering each of the provided pixon kernel functions. Thus, each object point is smoothed with its corresponding pixon kernel function as indicated in the pixon map P. For the first iteration, one prepares an initial image object $I_{p,0}$ with the dimension of the object that is smoothed, and with data points having value zero, and a kernel pointer kdx (identifying the kernel function) (steps 1400 and 1410).

The pseudo-object $\Psi'$, the initial image object $I_{p,0}$, the kernel pointer kdx, and the pixon map P are also then provided to a single-kernel function forward update (step 1420). Output parameters of the single-kernel function forward update (step 1420) are the unchanged kernel pointer kdx and an updated image object $I_{kdx}$. At the end of each iteration, one determines whether another pixon kernel function update is necessary (step 1430). If another update is necessary the kernel pointer kdx is increased (step 1410). Otherwise, if all kernel functions have been considered, one assigns the updated image object $I_{kdx}$ to be the pixon smoothed object $I_p$. The pixon smoothed object $I_p$ is used, for example, as an input object of the loop over the subsets.

FIG. 15 shows, in detail, the steps in the single-kernel function forward update (step 1420) of an image object $I_{kdx-1}$ as discussed in connection with FIG. 14. The image object $I_{kdx-1}$ comprises smoothed values for all object points, for which the pixon map P indicated smoothing with pixon kernel functions identified by kernel pointers smaller than the current kernel pointer kdx. For the update, the pseudo-object $\Psi'$ is smoothed with the kernel function indicated by the current kernel pointer kdx in a field F of pixon kernel functions (step 1500). The result is a smoothed pseudo-object $\Psi'_{kdx}$.

Then, one determines how much a data point is affected by the current kernel function (step 1510). The corresponding calculation uses the pixon map P and the current value of the kernel pointer kdx to determine a temporary field, temp, which is zero if the object point is not affected. The temporary field, temp, has values between 0 and 1 when two kernel functions are used for the smoothing of the object point, and a value of 1 when only the current pixon kernel function is used for smoothing of the object point. For updating each affected object point of the image object $I_{kdx-1}$, one adds, to the current value of the image object $I_{kdx-1}$, the product of the values of the temporary field, temp, and of the smoothed pseudo-object $\Psi'_{kdx}$ of that object point (step 1520). The result is the updated image object $I_{kdx}$.

Backward Pixon Smoothing

Additionally, or as an alternative to the pixon forward smoothing with the operator K, a backward pixon smoothing can be used within the NNLS reconstruction algorithm. In this case, one generates a smoothed object with a transposed pixon operator $K^T$. FIG. 16 shows an exemplary backward pixon smoothing operation, which could be applied, e.g., in FIG. 13. Within the single-kernel backward update (step 630), one applies the transposed pixon kernel operator $K^T$ instead of the pixon kernel operator K of the single kernel forward update of FIG. 14 (step 1420).

For the smoothing operation, one prepares the initial pseudo-object $\Psi_0$ and the kernel pointer kdx, which indicates which one of the pixon kernel functions is applied during the single-kernel backward update. An input object I' (e.g., the output of the loop over the subsets) and the pixon map P are also used within the update to determine an updated pseudo-object $\Psi_{kdx}$. One then evaluates whether to include a further pixon kernel function in the smoothing or whether all kernel functions have been considered, in which case the pseudo-object $\Psi_{kdx}$ becomes the smoothed pseudo-object $\Psi_p$. In the case of FIG. 13, the smoothed pseudo-object $\Psi_p$ is the updated object $I_{update}$.

FIG. 17 shows an exemplary implementation of the transposed pixon Kernel $K^T$ for, e.g., the single-kernel backward update (step 1600). In this case, one begins the procedure by selecting those data points of an input object I', the smoothed values of which have contributions of the smoothing with a specific pixon kernel function. Specifically, one calculates the entries of a temporary field, temp, by taking the maximum of zero or the difference between one and the modulus of the difference between the corresponding entry of the pixon map P and the value of the kernel pointer kdx (step 1700). Then, one updates the temporary field, temp, by multiplying the temporary field, temp, with the input image I' (step 1710). The updated temporary field, temp, contains only non-zero entries for those data points that are to be updated with the specific kernel function. The updated temporary field, temp, is then smoothed over a pixon kernel function (step 1720), which is read from the field F of pixon kernel functions using the kernel counter kdx. The result is a smoothed object $I'_{kdx}$. As every data point of the updated temporary field, temp, is smoothed over the pixon kernel function, the number of data points of the smoothed object $I'_{kdx}$ with non-zero values is most probably larger than the number of non-zero data points of the updated temporary field, temp. Finally, the updated pseudo-object $\Psi_{kdx}$ is created by adding the smoothed object $I'_{kdx}$ to the preceding pseudo-object $\Psi_{kdx-1}$ (step 1730).

Alternatively, or in addition, to the pixon smoothing operations shown in FIG. 13, a pixon forward smoothing operation can be introduced within the subset-loop before the single NNLS update (step 200) and a pixon backward smoothing operation can be introduced subsequent to the single NNLS update (step 200) within the subset-loop. Additional pixon smoothing operations can be applied before entering the iteration cycle or after having aborted the iteration. The algorithm may include only one of the backward or forward pixon smoothing operations within an iteration cycle or the subset-loop, or the algorithm may include multiple backward or forward pixon smoothing operations. The multiple pixon smoothing operations can be executed within an iterative cycle that itself might be quality controlled.

Pixon Smoothing of Parameter Objects

Figure 18:
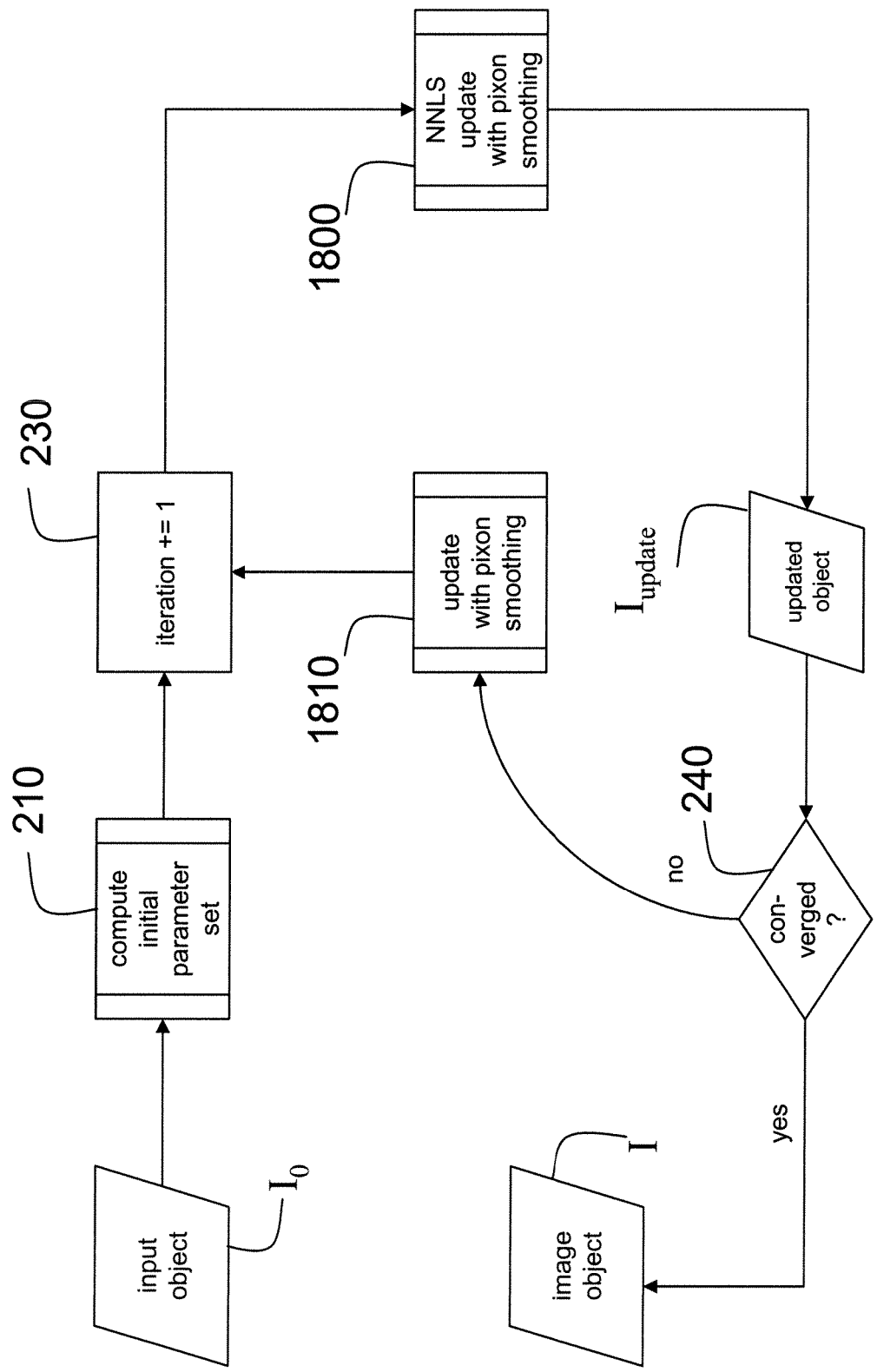
FIG. 18 is a flowchart illustrating a second example of an iterative NNLS algorithm using pixon smoothing with in the NNLS and the parameter update.

Alternatively, or in addition, to the pixon smoothing operations on the updated images, a pixon smoothing operation can be applied to a parameter object in object space that is generated during the algorithm, for example, for calculations within the single NNLS update (step 200) or for calculations with the update of the parameter set (step 220). FIG. 18 shows such a modified algorithm, which is similar to the algorithm of FIG. 2, that uses a NNLS update operation with pixon smoothing (step 1800) and a parameter update operation with pixon smoothing (step 1810).

Figure 19:
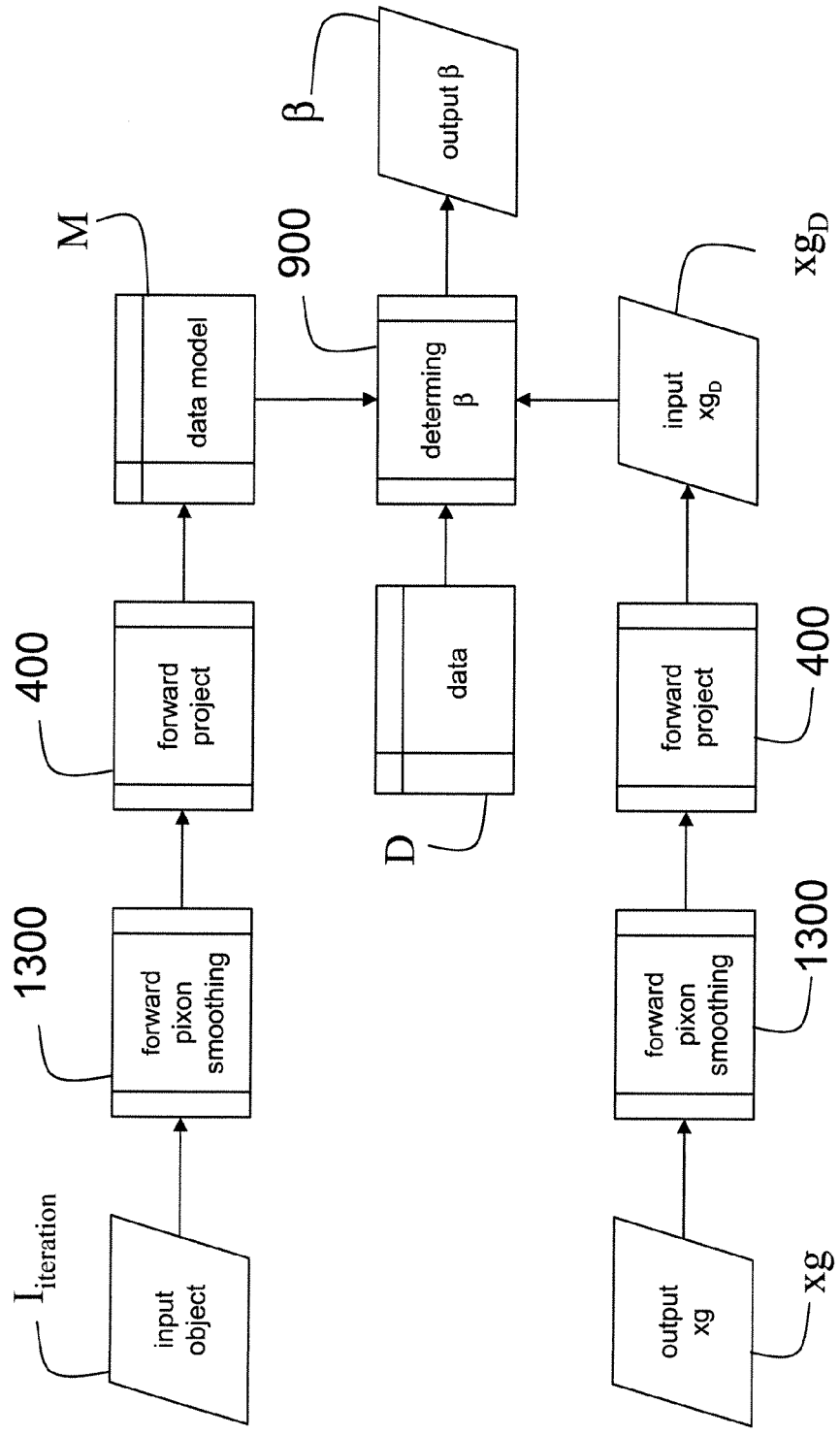
FIG. 19 is a flowchart illustrating a determination of an update factor of the NNLS update operation using pixon smoothing operations.

When introducing pixon smoothing, one can substitute a forward projection operation with a sequence of a forward pixon smoothing operation and a forward projection operation. Similarly, one can substitute a backward projection operation with a sequence of a backward projection operation and a backward pixon smoothing operation. Within the single NNLS update operation with pixon smoothing (step 1800), one can introduce pixon smoothing operation when calculating the data model M or the preliminary gradient $xg_D$ in data space for the determination of the factor β, as shown in FIG. 19. When calculating the preliminary auxiliary gradient $xg_p$ (step 310) as described in connection with FIG. 5, one can introduce a forward pixon smoothing operation when calculating the data model M. Alternatively, or in addition, on can introduce a backward pixon smoothing operation after the backward projection operation (step 510).

When applying the pixon smoothing operations (or any of alternative smoothing operations) in the context of FIG. 5, one may use as the backward pixon smoothing operation the transpose operation of the before used forward pixon smoothing operation. This is motivated by the calculation of a merit function $$\chi^2 = \frac{(d - HK\psi)^2}{d + s}$$

where H is the system matrix and the image I is written as I=KΨ using the (pixon) smoothing operator. Then, HKΨ corresponds the data model in FIG. 5 and d is the measured data set that is modified by the statistical-data-offset number s, which is in FIG. 5, selected to be 1. Then, the gradient of the merit function $$\nabla_\psi \chi^2 = K^T H^T \frac{(d - HK\psi)}{d + s}$$

suggests the use the smoothing operator K and its transposed operator $K^T$.

Another example of introducing an optional pixon smoothing is indicated in FIG. 6 for the calculation of the preconditioner object pc (step 330). In the optional case, one applies a backward pixon smoothing operation (step 630) to an "intermediate" preconditioner that is produced by the backward projection operation (step 610) of the weighted residuals R.

Pixon Map Update

Pixon smoothing is based on the pixon map P, which is based on the data set D and an object. When one determines the pixon map P, one statistically evaluates the effect of smoothing the object with a specific pixon kernel function. Thus, the pixon map P depends on the underlying object.

During the reconstruction process, one iteratively improves the estimation of the final image object I. Thus, one can adapt the pixon smoothing to the latest estimated object by determining an updated pixon map P, the construction of which is then based on the latest estimated object.

Figure 20:
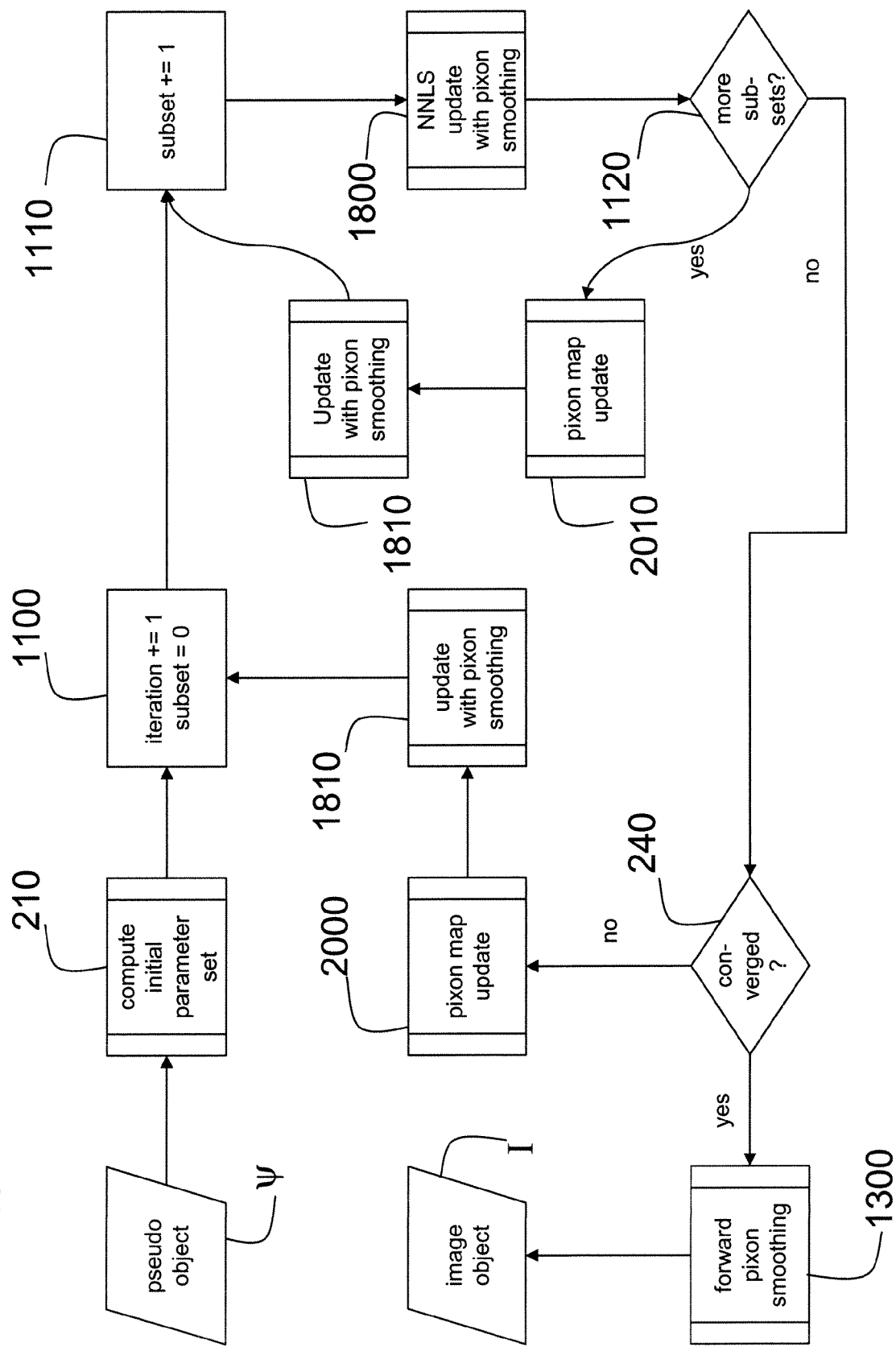
FIG. 20 is a flowchart illustrating a third example of an iterative NNLS algorithm using pixon smoothing, a pixon map update between iterations, and a pixon map update between subsets.

One can update the pixon map throughout the algorithm. As an example based on the algorithm shown in FIG. 11, FIG. 20 shows a pixon map update (step 2000) in the iteration and a pixon map update (step 2010) in the loop over subsets, each time before the update operations of the parameter set (step 1810).

To avoid excessive computational effort arising from the construction of the pixon map, one may wish to control when an update takes place and when it does not. As an exemplary control parameter, one can evaluate a change between the object that was used for the pixon map construction, and the most recent updated object $I_{update}$. Only if this change is significant will one construct a new pixon map based on the updated object $I_{update}$. A method to evaluate the change of the object can be based on the quality of the object as given, for example, by the modified chi-square-gamma statistic as discussed in connection with FIG. 11.

Figure 21:
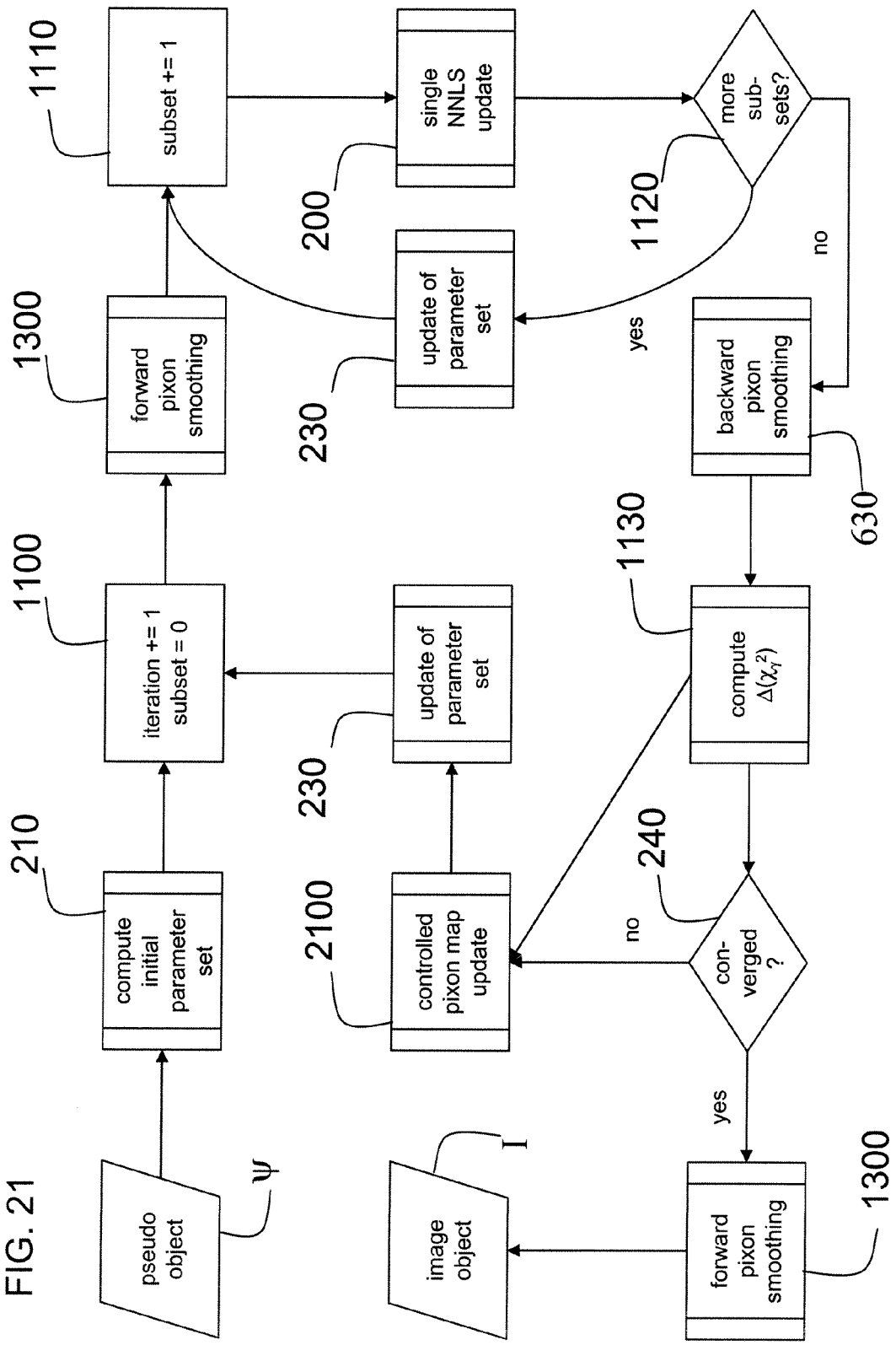
FIG. 21 is a flowchart illustrating a fourth example of an iterative NNLS algorithm using pixon smoothing with a controlled update operation of the pixon map in-between iterations.

Details of such a quality controlled pixon update are shown in FIG. 21, in which one determines the $\chi_\gamma^2$-statistic at the end of each iteration and uses the convergence-criterion $\Delta(\chi_\gamma^2)$ to evaluate whether another iteration is necessary (step 240). Before a next iteration, one uses the $\chi_\gamma^2$-statistic to determine whether the pixon map should be updated (step 2100). Thus, one evaluates, for example, whether the change of the stop-criterion, $Q(\chi_\gamma^2)$, associated with the last construction of the pixon map P to the current stop-criterion, $Q(\chi_\gamma^2)$, associated with the object $I_{update}$ indicates that the pixon smoothing operations could benefit from a newly constructed pixon map.

Modular Reconstruction

Figure 22:
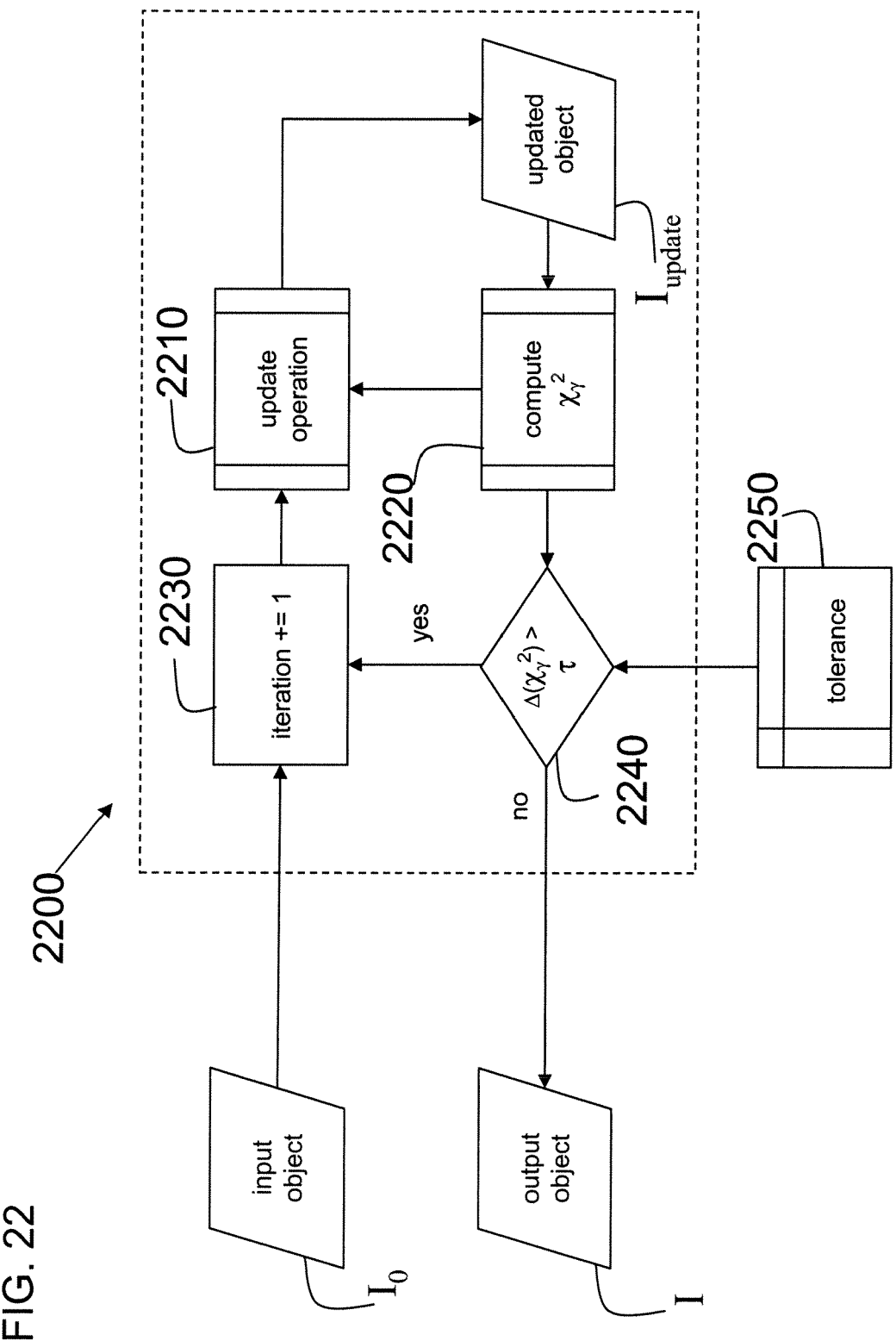
FIG. 22 is a flowchart illustrating a general concept of a modular reconstruction system.

FIG. 22 shows the details of a general concept of a modular reconstruction system. Specific examples were described with respect to FIGS. 2 to 21. In general, the initial object $I_0$ is updated using an iterative algorithm (step 2200), which results in an output object I. In the iterative algorithm (step 2200), one determines the updated object $I_{update}$ for an iteratively updated input object using an update operation (step 2210). The update operation is based on a set of modular reconstruction operations that include NNLS image reconstruction as described in connection with FIGS. 1-21, conventional image reconstruction, pixon smoothing, and combined pixon smoothing and reconstruction. Any of these operations that involve pixon smoothing can include its own construction and/or update of the involved pixon maps or they can use a pre-constructed pixon map.

A control unit controls the order in which the iterative algorithm (step 2200) applies the modular update operations (step 2210). The control unit can use a manual input of a user. In addition, or alternatively, an automated system can be used that is based, for example, on the quality of the reconstructed image, or the quality of a constructed pixon map. This is indicated in FIG. 22 by the arrow pointing from a determination of the modified chi-square-gamma statistic, $\chi_\gamma^2$, (step 2220) to the update operation (step 2210).

In FIG. 22, an iterative cycle is indicated by increasing an increment, iteration (step 2230). As discussed in connection with the examples of the NNLS reconstruction algorithms, the number of iterations can be preset, manually assigned, or a convergence or stop-criterion can be calculated (step 2220) after completing an iteration step. In the case shown in FIG. 22, an evaluation (step 2240) determines whether a data model, corresponding to an updated object $I_{update}$ of each iteration, fulfills a preset condition. For example, one compares a convergence-criterion that characterizes the change of the quality of the estimate with a threshold, $\tau$, which is stored in a tolerance table 2250.

A number of embodiments have been described. Nevertheless, it will be understood that various modifications may be made without departing from the spirit of the invention. For example, the NNLS algorithm can be incorporated into data reconstruction algorithms in different technological fields, such as astronomy, communication technology and medical imaging for 3D (image) reconstruction. Thus, the NNLS algorithm, the pixon map construction, and the pixon smoothing operation can be based on data sets measured in these technology fields.

The order in which the different pixon kernel functions are used during the smoothing operation can be varied, the step size can be varied, or some pixon kernel functions may be considered only in defined areas of the image.

The table F of pixon kernel functions may comprise, for example, in the order of ten spherical pixon kernel functions. If one does not want to impose symmetry, one may use additionally or alternatively elliptical pixon kernel functions. However, asymmetric pixon kernel functions may increase the computational effort, which one can handle, for example, by using specifically designed hardware.

The pixon map P can be provided, for example, as a field of variables defining the pixon kernel functions or as a field of indices, which indicate kernel functions within the table F of the pixon kernel functions.

Various combinations of the combined pixon smoothing and reconstruction described referring to FIGS. 1 to 22 can be employed. Additionally, one may apply one or more operations between the pixon smoothing operation and the projection if it seems appropriate. For example, one can store the unsmoothed object for a later evaluation.

The pixon smoothing operation may be the calculation of an average of the values of the object points within the volume defined by the corresponding pixon kernel function. The pixon smoothing within the reconstruction can be applied multiple times until the quality of a corresponding data model fulfills a stop-criterion characterizing the goodness-of-fit of a current data model.

Instead of being supplied to a renderer for visualization, the output object can be supplied to a record keeping system (e.g., PACS system) or a system for automatic quantitative diagnosing.

The source of the radiation may be an object or patient positioned within the detecting area of the nuclear imaging system.

It is to be further understood that, because some of the constituent system components and method steps depicted in the accompanying figures can be implemented in software, the actual connections between the systems components (or the process steps) may differ depending upon the manner in which the disclosed method is programmed. Given the teachings provided herein, one of ordinary skill in the related art will be able to contemplate these and similar implementations or configurations of the disclosed system and method.

For example, the numerical and symbolic steps described herein can be converted into a digital program executed, e.g., on a digital signal processor according to methods well known in the art. The digital program can be stored on a computer readable medium such as a hard disk and can be executable by a computer processor. Alternatively, the appropriate steps can be converted into a digital program that is hardwired into dedicated electronic circuits within the compressor that executes the steps. Methods for generating such dedicated electronic circuits based on a given numerical or symbolic analysis procedure are also well known in the art.

Accordingly, other embodiments are within the scope of the following claims.

What is claimed is:

1. A method of reconstructing a three-dimensional image object associated with an input data set, the method comprising: reconstructing the three-dimensional image object from the input data set representing radiation detected by an imaging detector, the reconstructing being as a function of a matrix describing properties of the imaging detector, wherein:

for each step, in a series of iteration steps for performing the reconstructing, determining an updated three-dimensional object from an input three-dimensional object based on a data model of the input three-dimensional object, a weighting-factor data set, and a gradient object determined based on a residual data set, wherein the weighting-factor data set includes modified entries of the input data set;

and following a last iteration, outputting one of the updated three-dimensional objects as the reconstructed three-dimensional image object, the reconstructed three-dimensional image object representing a volume scanned by the imaging detector.

2. The method of claim 1, wherein determining an updated three-dimensional object includes:

determining the data model of the input three-dimensional object;

determining a residual data set from the data model and the input data set;

determining the weighting-factor data set by modifying the entries of the input data set;

determining the gradient object based on the residual data set and the weighting-factor data set; and performing an update operation for updating the input three-dimensional object based on the gradient object, thereby creating the updated three-dimensional object.

3. The method of claim 2, wherein determining the weighting-factor data set includes determining the sum of the value of the input data set at a data point and a statistical-data-offset number.

4. The method of claim 2, wherein determining the gradient object includes for each data point, dividing the value of the residual data set by the corresponding value of the weighting-factor data set, thereby creating a weighted-residual data set;

projecting the weighted-residual data set into object space, thereby creating a preliminary-gradient object; and constraining the preliminary-gradient object to yield the gradient object.

5. The method of claim 4, wherein constraining the preliminary-gradient object includes generating a temporary object by inverting a preconditioner object;

setting a value of the temporary object to zero for an object point having a negative value of the input three-dimensional object; and multiplying the values of the preliminary-gradient object with the associated adjusted temporary object to yield the gradient object.

6. The method of claim 5, the method further comprising calculating the preconditioner object based on a result of inverting the weighting-factor data set.

7. The method of claim 5, wherein calculating the preconditioner object includes projecting the inverted values of the weighting-factor data set into object space.

8. The method of claim 1, wherein determining the update three-dimensional object further includes determining a scalar factor based on the gradient object, the residual data set, and the weighing-factor data set.

9. The method of claim 8, wherein determining the scalar factor includes projecting the gradient object into data space, thereby creating a gradient data set;

for each data point, dividing the product of the entries of the gradient data set and the residual data set, by the corresponding entry of the weighting-factor data set, thereby creating a numerator data set;

for each data point, dividing the square of the data gradient by the weighting factor, thereby creating a denominator data set; and determining the ratio of the sum over the entries of the numerator data set and the sum over the entries of the denominator data set, thereby creating the scalar factor.

10. The method of claim 8, wherein performing the update operation includes adding, to a value of the input three-dimensional object, the product of the corresponding value of the gradient object and the scalar factor.

11. The method of claim 1, wherein determining the updated three-dimensional object includes a smoothing operation selected from the group consisting of smoothing operations based on pixon smoothing, smoothing operations based on Fourier filtering, smoothing operations based on wavelet filtering, smoothing operations based on filtering with a Wiener filter, and smoothing operations based on filtering with a fixed filter.

12. The method of claim 11, wherein the smoothing operation is performed in series with the update operation.

13. The method of claim 11, the method further comprising performing the smoothing operation, thereby creating a smoothed object; and performing a forward projection operation of the smoothed object from an object space into a data space.

14. The method of claim 11, wherein determining the update three-dimensional object further includes determining a scalar factor based on the gradient object, the residual data set, and the weighing-factor data set, and wherein determining the scalar factor includes before projecting the gradient object into data space, performing the smoothing operation on the gradient object.

15. The method of claim 11, the method further comprising performing a backward projection operation, thereby creating a back-projected object; and performing the pixon smoothing operation on the back-projected object.

16. The method of claim 4, wherein determining the updated three-dimensional object includes projecting the weighted-residual data set into object space, thereby creating a weighted-residual object; and performing a smoothing operation on the weighted-residual object, thereby creating the preliminary-gradient object.

17. The method of claim 7, wherein calculating the preconditioner object includes following projecting the inverted values of the weighting-factor data set into object space, and performing a smoothing operation, thereby creating the preconditioner object.

18. The method of claim 1, wherein determining the updated three-dimensional object includes updating a constraining map of a smoothing operation based on the input data set and the updated object of the preceding iteration step.

19. The method of claim 18, wherein determining the updated three-dimensional object includes determining whether the constraining map update is necessary; and updating the constraining map based on the result of the evaluation, the input data set, and an updated object of the image three-dimensional object.

20. The method of claim 1, wherein determining the updated three-dimensional object includes determining that a convergence-criterion of the data model has transitioned from being outside the limitation of a preset threshold value to being inside the limitation.

21. The method of claim 20, wherein determining the convergence-criterion includes setting the convergence-criterion to be the difference between the values of a chi-square-gamma statistic derived from two succeeding updated three-dimensional objects.

22. The method of claim 1, wherein determining an updated three-dimensional object includes performing a loop over subsets of the data set, and performing the update operation within the loop.

23. A nuclear imaging device for providing a 3D image object, the device comprising:
   a detector unit for detecting radiation emitted from within a detecting area and providing an input data set indicative of the detected radiation;
   an iterative reconstruction unit configured to for each step, in a series of iteration steps for performing the reconstructing from the input data set to the 3D image object as a function of a matrix describing properties of the detector unit, determining an updated object from an input object based on a data model of the input object, a weighting-factor data set, and a gradient object determined based on a residual data set, wherein the weighting-factor data set includes modified entries of the input data set; and
   an output port for providing one of the updated objects as a reconstruction of the 3D image object, the reconstructed 3D image object representing a volume scanned by the imaging detector.

24. The nuclear imaging device of claim 23, wherein the detector unit comprises a detector system selected from the group consisting of a positron emission tomography detector system and a single photon computed tomography detector system.

25. In a computer readable medium having included software thereon, the software including instructions to reconstruct a three-dimensional image object associated with an input data set, the instructions comprising:
   reconstructing the three-dimensional image object from the input data set representing radiation detected by an imaging detector, the reconstructing being as a function of a matrix describing properties of the imaging detector, wherein:
   for each step, in a series of iteration steps for performing the reconstructing, determining an updated object from an input object based on a data model of the input object, a weighting-factor data set, and a gradient object, wherein the weighting-factor data set includes modified entries of the input data set; and
   following a last iteration, outputting one of the updated objects as the three-dimensional image object, the reconstructed three-dimensional image object representing a volume scanned by the imaging detector.

* * * * *